United States Patent
Elder et al.

(10) Patent No.: US 9,445,541 B2
(45) Date of Patent: Sep. 20, 2016

(54) LIGHT RIDING VEHICLE WITH VARIABLE FRICTION DRIVE

(75) Inventors: Matthew Elder, Orangeburg, SC (US); Brad Graham, Summerville, SC (US); Justin Warner, Milford, MI (US); Eric Canonge, Charlotte, NC (US); Warren W. Pendry, Orangeburg, SC (US); Lennie D. Rhoades, Charlotte, NC (US); Jeffrey C. Hickman, Concord, NC (US); Darren Chandler, Orangeburg, SC (US); Duncan Burns, Jr., Charlotte, NC (US); Rick Nelson, Lexington, SC (US); Alex Evrard, Concord, NC (US); Jeremy Hansen, Charlotte, NC (US); Chris Roth, Harrisburg, NC (US)

(73) Assignee: HUSQVARNA AB, Huskvarna (SE)

( * ) Notice: Subject to any disclaimer, the term of this patent is extended or adjusted under 35 U.S.C. 154(b) by 163 days.

(21) Appl. No.: 14/118,631

(22) PCT Filed: May 31, 2011

(86) PCT No.: PCT/US2011/038623
§ 371 (c)(1),
(2), (4) Date: Nov. 19, 2013

(87) PCT Pub. No.: WO2012/166123
PCT Pub. Date: Dec. 6, 2012

(65) Prior Publication Data
US 2014/0080670 A1  Mar. 20, 2014

(51) Int. Cl.
*A01D 34/00* (2006.01)
*A01D 69/08* (2006.01)
(Continued)

(52) U.S. Cl.
CPC ............... *A01D 34/00* (2013.01); *A01D 69/06* (2013.01); *F16H 15/10* (2013.01); *F16H 37/0813* (2013.01); *F16H 61/6649* (2013.01); *Y10T 477/688* (2015.01)

(58) Field of Classification Search
CPC ...... A01D 69/10; A01D 34/00; A01D 69/08; F16H 15/10; Y10T 477/688; F16D 7/025; F16D 43/215
USPC ............................... 192/54.5, 93 A; 56/11.3
See application file for complete search history.

(56) References Cited

U.S. PATENT DOCUMENTS 2,620,612 A * 12/1952 De Eugenio ................. 56/11.6
2,838,124 A *  6/1958 Cramer, Jr. ................... 180/366
(Continued)

FOREIGN PATENT DOCUMENTS

| EP | 0561528 B1 | 5/1997 |
| JP | 8024474 B2 | 3/1996 |
| JP | 10311356 A | 11/1998 |

OTHER PUBLICATIONS

International Search Report and Written Opinion of PCT/US2011/038623 mailed May 31, 2011.
(Continued)

*Primary Examiner* — Jacob S Scott
*Assistant Examiner* — Tinh Dang
(74) *Attorney, Agent, or Firm* — Nelson Mullins Riley & Scarborough LLP

(57) ABSTRACT

Riding lawn mowers may utilize friction drives configured with a variable normal force between frictional components. In a riding lawn mower, an internal combustion engine may be coupled to a differential via a friction drive, wherein the friction drive is configured with a variable normal force in order to provide improved power transfer and/or shifting performance.

20 Claims, 18 Drawing Sheets

(51) Int. Cl.
    *F16D 7/02*     (2006.01)
    *F16D 43/21*     (2006.01)
    *F16H 15/10*     (2006.01)
    *A01D 69/06*     (2006.01)
    *F16H 61/664*     (2006.01)
    *F16H 37/08*     (2006.01)

(56) References Cited

U.S. PATENT DOCUMENTS

| | | | | |
|---|---|---|---|---|
| 3,229,452 A | * | 1/1966 | Hasenbank | 56/10.5 |
| 3,302,474 A | * | 2/1967 | Edlich | F16H 15/06 475/216 |
| 3,706,363 A | | 12/1972 | Niles | |
| 4,402,237 A | * | 9/1983 | Tomlinson | 475/205 |
| 4,498,552 A | | 2/1985 | Rouse | |
| 4,523,917 A | * | 6/1985 | Schildt | 474/19 |
| 5,784,870 A | * | 7/1998 | Seegert et al. | 56/320.1 |
| 6,098,386 A | * | 8/2000 | Shimizu et al. | 56/14.7 |
| 2003/0221882 A1 | | 12/2003 | Long | |
| 2012/0007349 A1 | * | 1/2012 | Moore | 280/759 |

OTHER PUBLICATIONS

Chapter I International Preliminary Report on Patentability of PCT/US2011/038623 mailed Dec. 2, 2013.

* cited by examiner

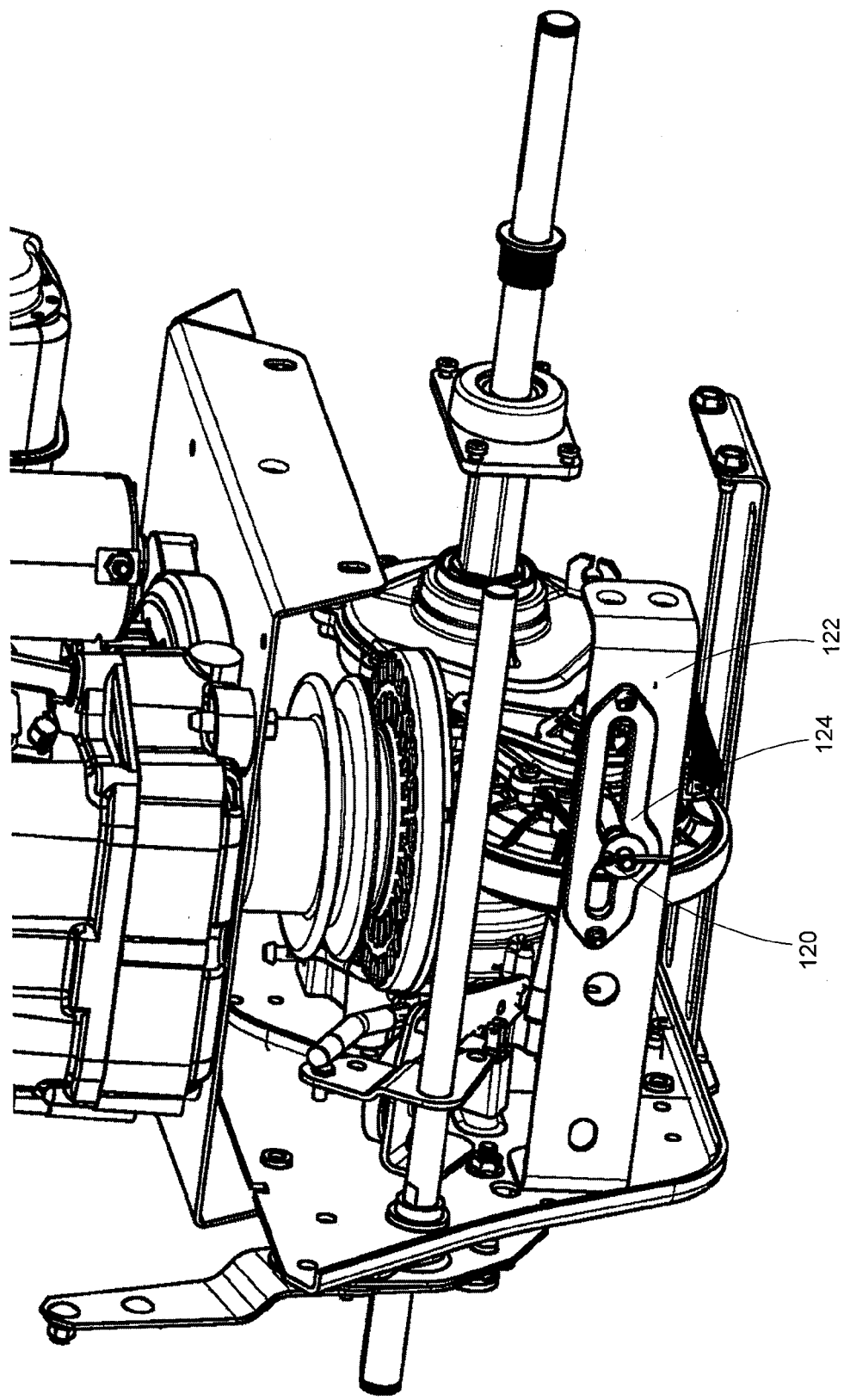

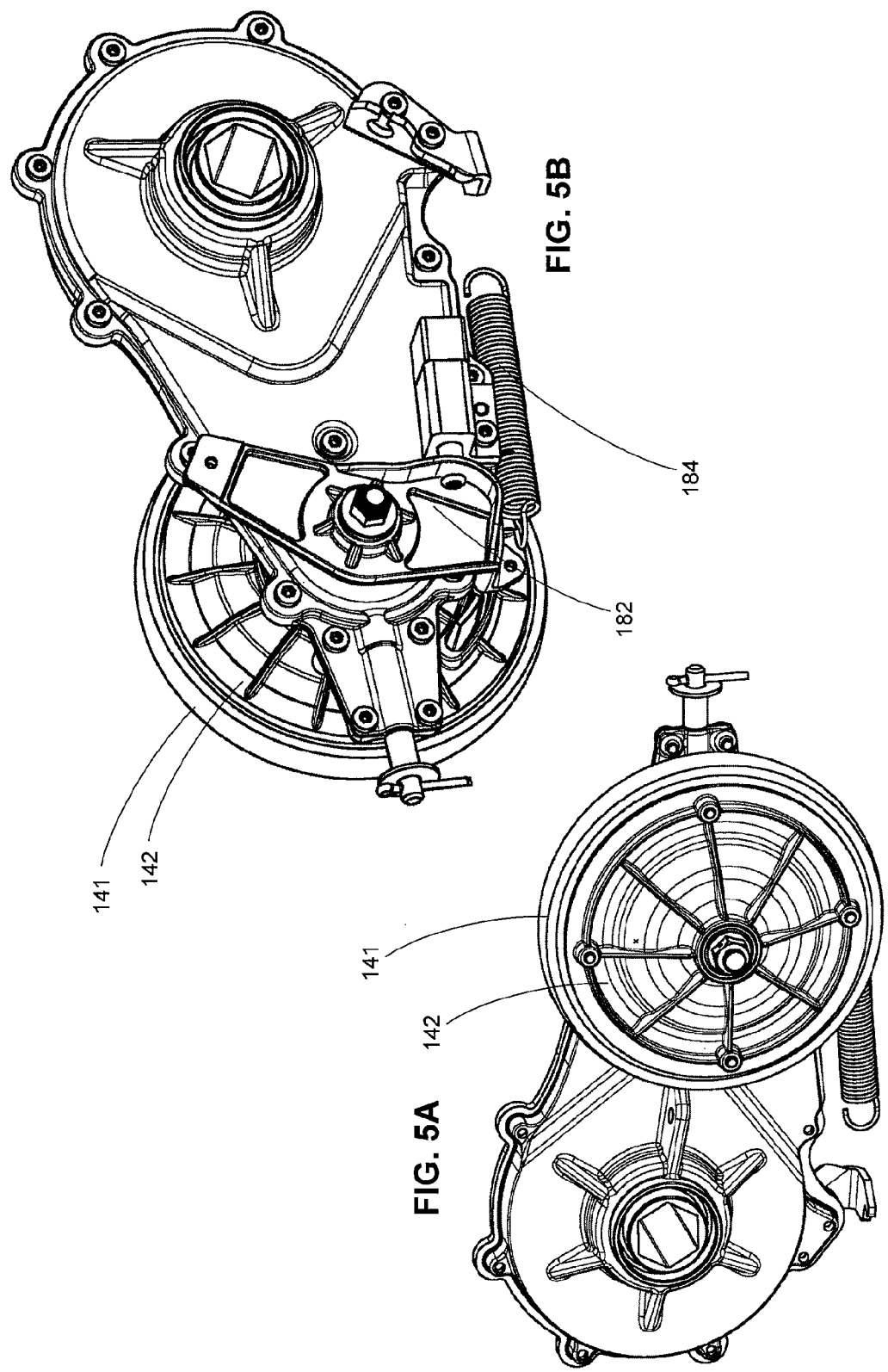

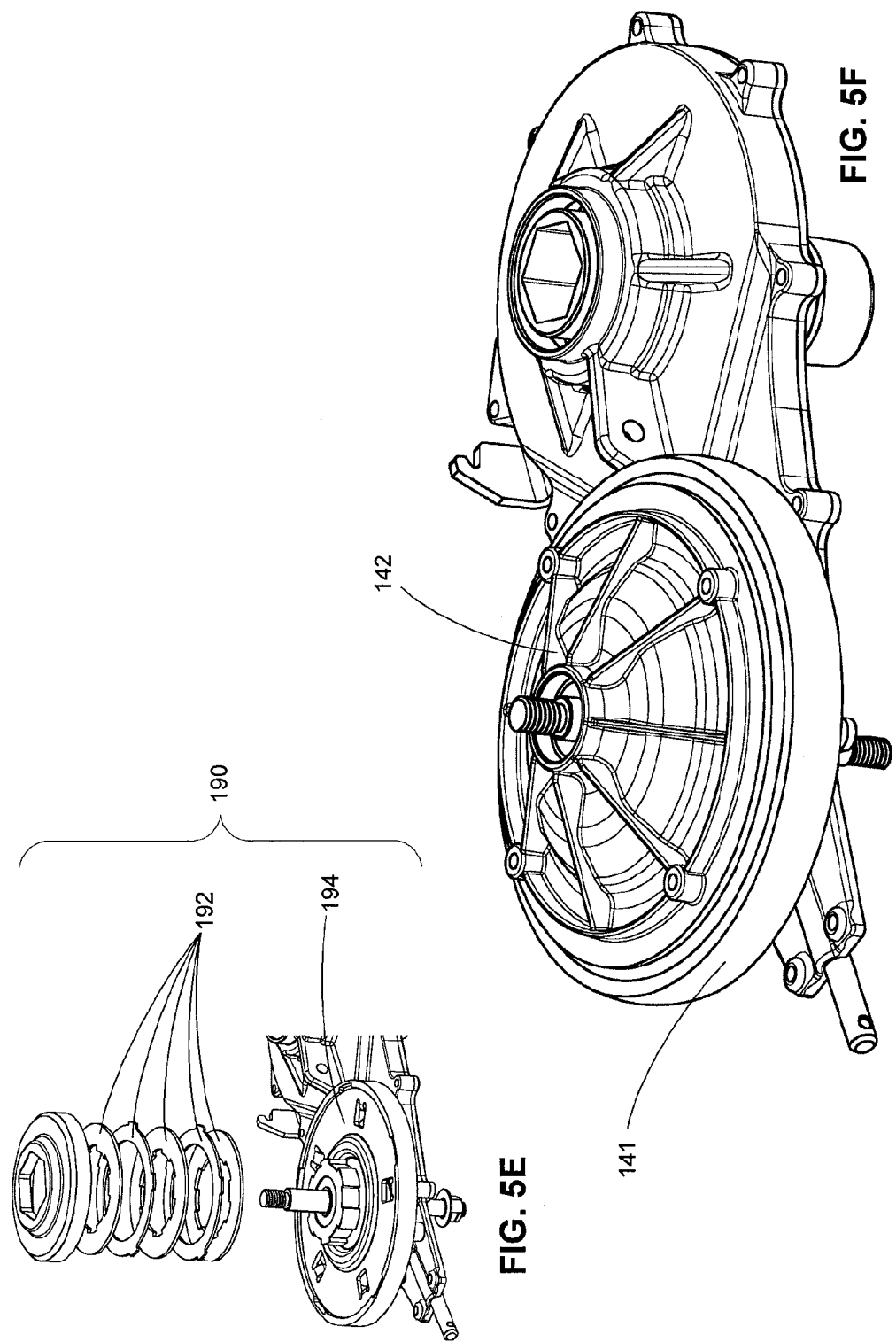

LIGHT RIDING VEHICLE WITH VARIABLE FRICTION DRIVE

TECHNICAL FIELD

The present disclosure relates to vehicles, and in particular, to vehicles configured for lawn maintenance including mowing.

BACKGROUND

Grass is commonly maintained with lawn care machinery such as lawn mowers, lawn tractors, and/or the like. Walk-behind lawn mowers are often compact and inexpensive, and are usually configured with comparatively small engines of less than about 200 cubic centimeters (cc). At the other end of the spectrum, traditional ride-on lawn tractors or other riding lawn mowers can be quite large, have engine sizes generally exceeding 400 cc, and can be configured with various functional accessories (e.g., trailers, tillers, and/or the like) in addition to grass cutting components. Attempts to create smaller, less-expensive riding lawn mowers have been unable to overcome various difficulties and/or have been configured with drive systems having certain performance deficiencies.

SUMMARY

This disclosure relates to systems and methods for riding lawn mowers and components thereof. In an exemplary embodiment, a riding lawn mower comprises an internal combustion engine, and a differential coupled to the engine via a friction drive. The friction drive comprises a friction plate and a friction wheel engageable to the friction plate. The friction wheel and friction plate are engaged via a variable normal force.

In another exemplary embodiment, a drivetrain for a riding lawn mower comprises a friction wheel, and a friction plate frictionally engageable with the friction wheel. The friction plate is coupled to a flywheel. The drivetrain further comprises a differential comprising at least one plastic gear. The differential is coupled to the friction wheel in order to transfer power to at least one drive wheel of the riding lawn mower.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIGS. 3A and 3B illustrate a riding lawn mower drivetrain including a friction drive in accordance with an exemplary embodiment;

FIGS. 5A-5F illustrate an integrated brake and clutch for a riding lawn mower in accordance with an exemplary embodiment;

DETAILED DESCRIPTION

Figure 1A:
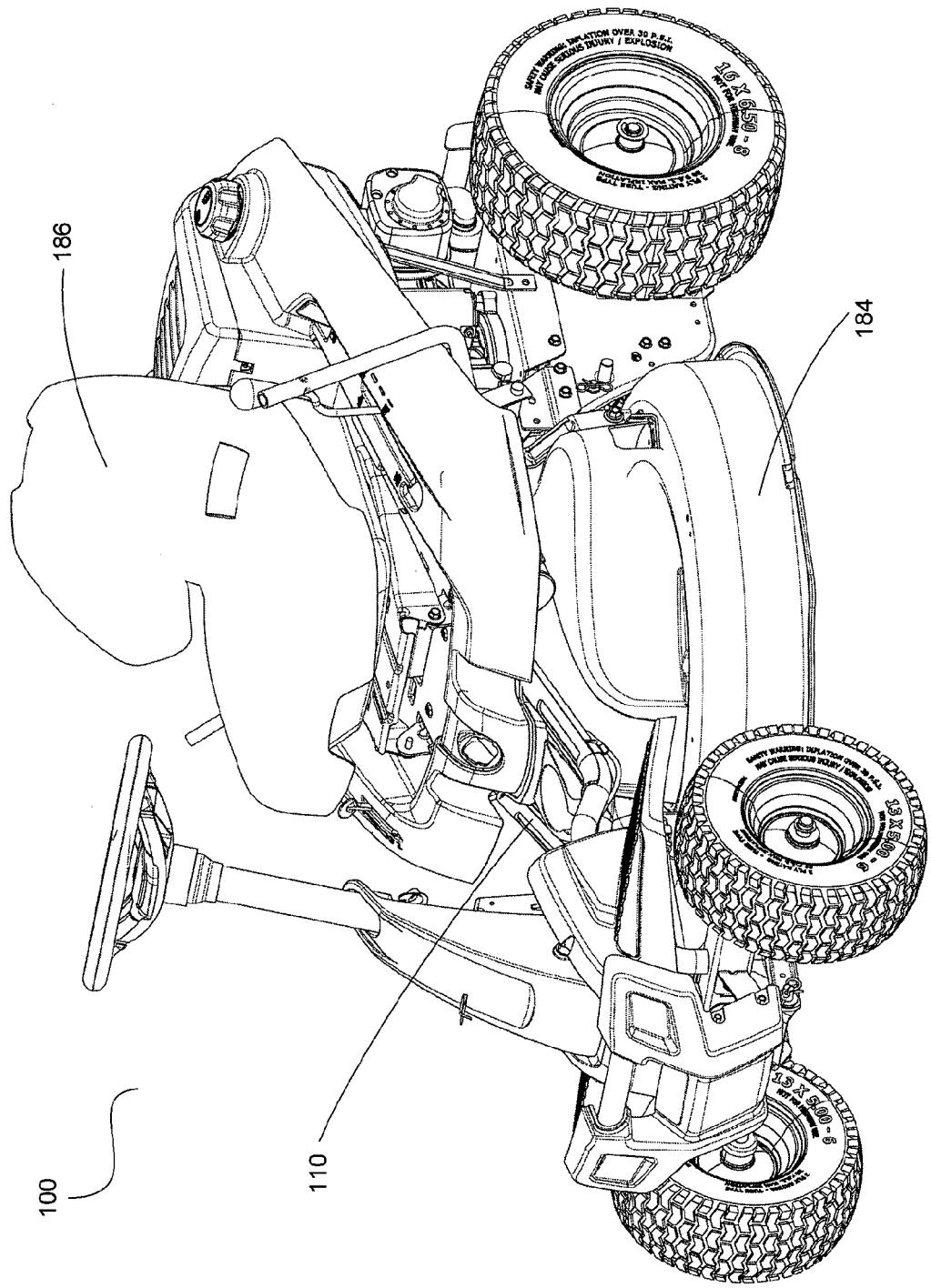
FIGS. 1A and 1B illustrate an exemplary riding lawn mower in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection. Like reference numerals refer to like elements throughout.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical light riding vehicle, for example a riding lawn mower.

Systems of the present disclosure reduce and/or eliminate problems with prior riding lawn mowers. For example, various riding lawn mowers configured in accordance with the present disclosure are configured to utilize smaller and/or less expensive engines, for example engines having displacement of up to about 350 cc and/or about 13 gross horsepower. Other riding lawn mowers configured in accordance with the present disclosure are configured to be smaller and/or lighter than certain prior riding lawn mowers. For example, an exemplary riding lawn mower configured in accordance with the present disclosure is configured with a dry, unboxed weight of about 285 pounds and a wheelbase of about 49.5 inches. Yet other riding lawn mowers configured in accordance with principles of the present disclosure are configured to be manufacturable at a reduced expense as compared to certain prior riding lawn mowers.

In various exemplary embodiments, a riding lawn mower is configured with a friction drive. As used herein, a "friction drive" generally refers to a drivetrain where power is transferred from the engine to at least one other operational component of the drivetrain via frictional engagement of two parts (for example, a flywheel and a friction wheel generally perpendicular to one another), rather than solely via a conventional drive shaft and gearset.

Figure 1B:
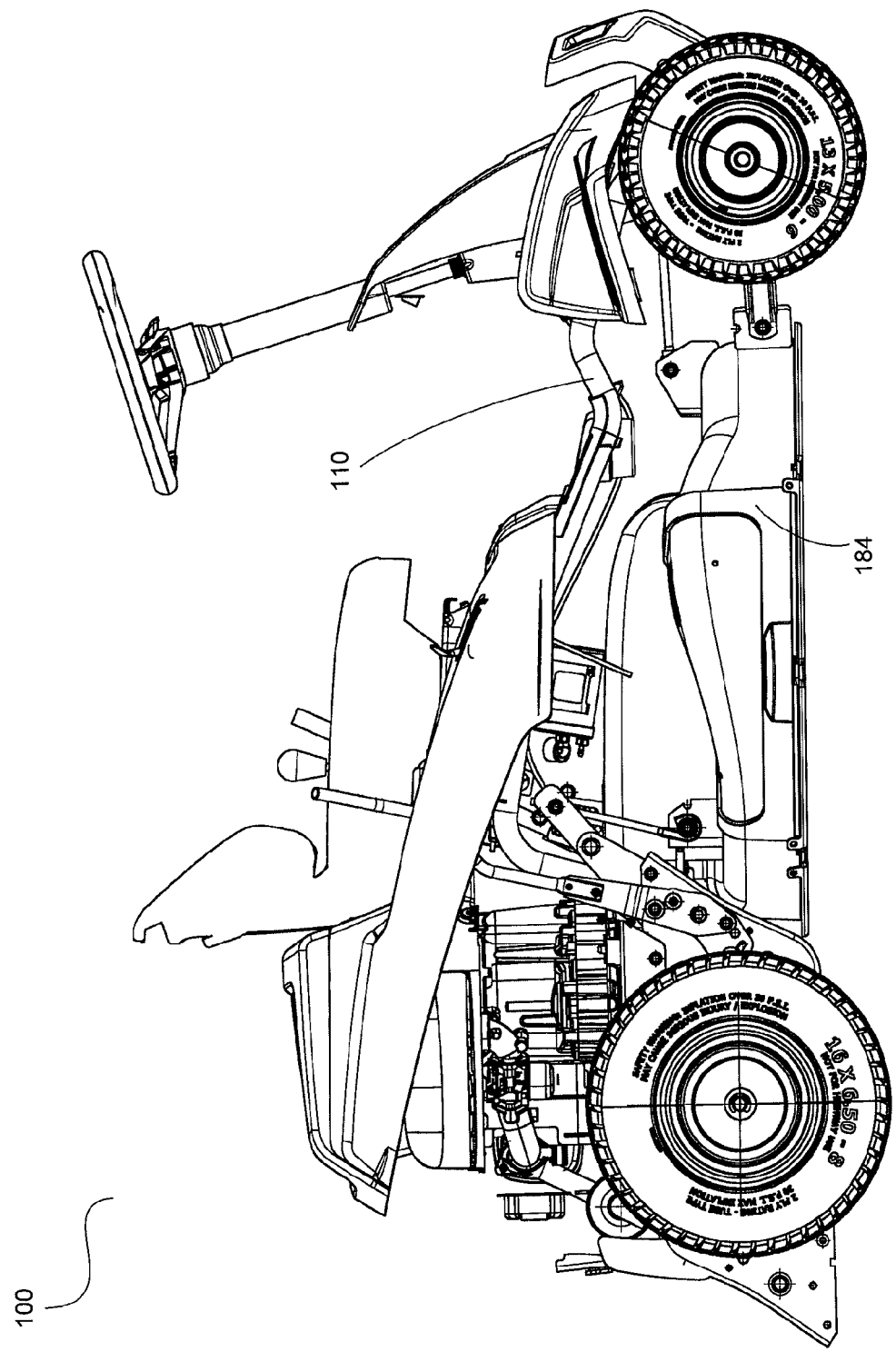

In various exemplary embodiments, with reference to FIGS. 1A and 1B, riding lawn mower 100 comprises a steerable powered vehicle configured with various components for mowing a lawn. For example, riding lawn mower 100 comprises frame 110 coupled to a cutting deck 184 having at least one corresponding cutting blade. Moreover, riding lawn mower 100 may be configured with any suitable components configured to allow an operator to mow grass, for example a footrest 182, a seat 186, and/or the like.

Figure 1C:
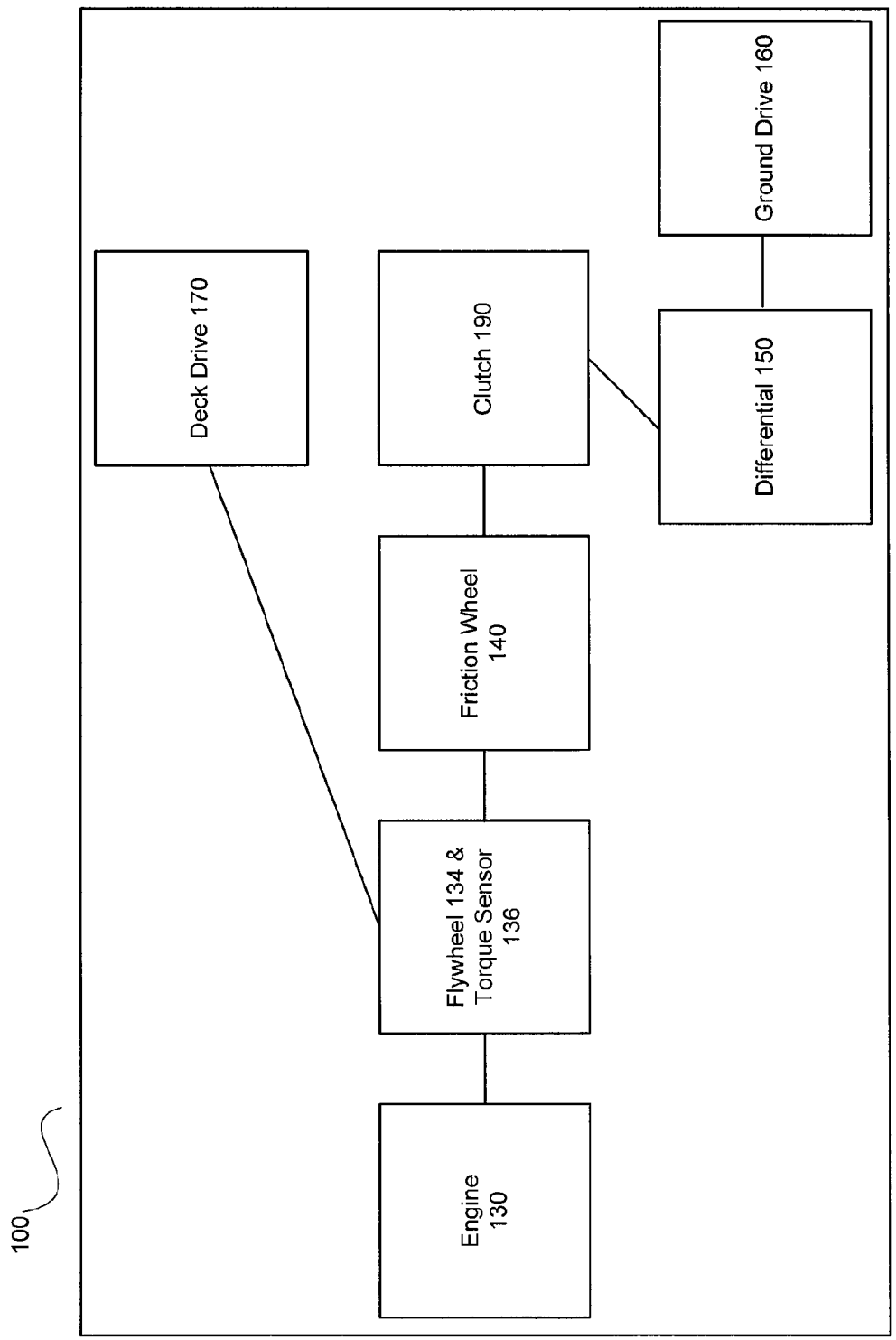
FIG. 1C illustrates a block diagram of components of an exemplary riding lawn mower in accordance with an exemplary embodiment.
Figure 2:
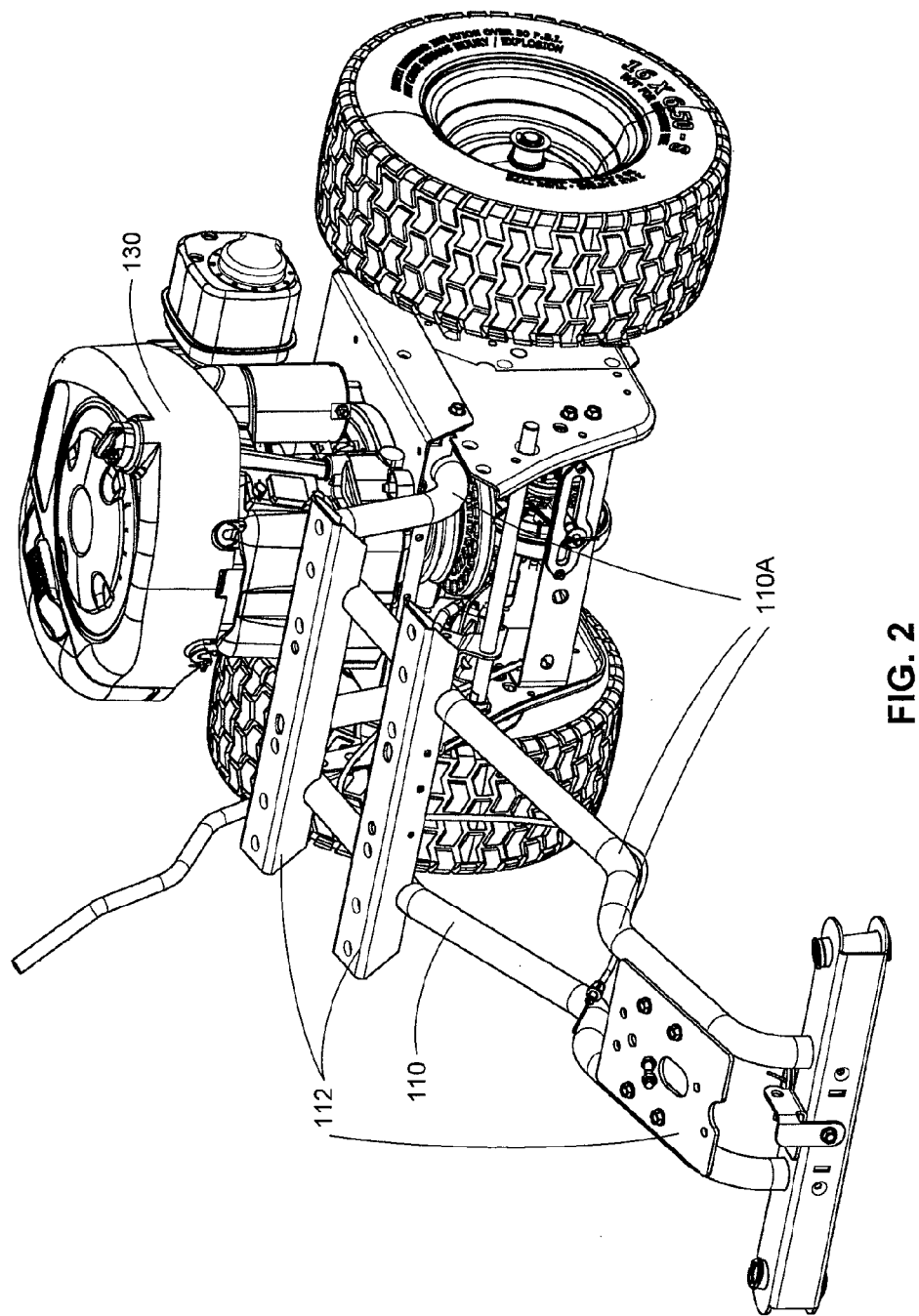
FIG. 2 illustrates a riding lawn mower frame and drivetrain in accordance with an exemplary embodiment.

With reference now to FIG. 1C, in various exemplary embodiments, riding lawn mower 100 further comprises engine 130 coupled to friction wheel 140. Engine 130 is coupled to friction wheel 140 via a flywheel 134 associated with a torque sensor 136. Friction wheel 140 is coupled to differential 150 (e.g., via a clutch 190 and/or via one or more of driveshafts, pinions, chains, and/or the like) in order to transfer power to differential 150. Differential 150 transfers operational power to ground drive 160. Flywheel 134 is also coupled to deck drive 170 via, for example, one or more of belts, pulleys, driveshafts, pinions, chains, and/or the like.

In various exemplary embodiments, engine 130 comprises an internal combustion engine, for example an internal combustion engine fueled by gasoline, diesel fuel, ethanol, and/or any other suitable fuel. Engine 130 may be configured with a displacement from about 190 cc to about 500 cc. Engine 130 may comprise an engine typically utilized for a walk-behind lawn mower. In one exemplary embodiment, engine 130 comprises a Briggs and Stratton model 21 engine having a displacement of about 342 cc. Moreover, engine 130 may comprise any engine configured to provide sufficient power to enable suitable operation of riding lawn mower 100 (e.g., partial or full operation of the ground drive and partial or full operation of the deck drive while supporting the weight of an operator, including operation over an inclined surface of up to about 15 degrees from horizontal.

In various exemplary embodiments, engine 130 may be configured with respect to the other components of riding lawn mower 100 so as to achieve a desired configuration of the center of gravity of engine 130. For example, engine 130 may be coupled to riding lawn mower 100 such that the center of gravity of engine 130 is located "ahead" (e.g., closer to the front of riding lawn mower 100) of the rear axle of riding lawn mower 100. Moreover, engine 130 may also be coupled to riding lawn mower 100 such that the center of gravity of engine 130 is located "behind" (e.g., closer to the rear of riding lawn mower 100) the front axle of riding lawn mower 100 and/or the center of gravity of riding lawn mower 100. In this manner, engine 130 may be located so as to reduce and/or minimize mechanical components coupling engine 130 to ground drive 160 and/or deck drive 170, for example by eliminating a belt coupling engine 130 to ground drive 160.

With reference now to FIGS. 1A, 1B, 2, and 6, in various exemplary embodiments, riding lawn mower 100 is configured with a frame 110. In an exemplary embodiment, frame 110 is configured with a pair of tubular structures (a "dual-tubular" frame). Frame 110 is configured to provide structural support to riding lawn mower 100. Frame 110 may comprise one or more of steel, aluminum, titanium, iron, and/or other suitable metals and/or alloys thereof. In an exemplary embodiment, frame 110 comprises HSLA 50 A-10 1102 hot rolled steel tubing having an outer diameter of between about 3 centimeters to about 3.3 centimeters. Moreover, frame 110 may further comprise and/or be coupled to various plates, brackets, flanges, fasteners, and/or the like, as suitable, in order to couple to and/or support other components of riding lawn mower 100.

In an exemplary embodiment, frame 110 is configured with a dual-tubular design in order to provide flexion within frame 110, for example responsive to riding lawn mower 100 passing over uneven ground. The spacing between tubes comprising frame 110 may be suitably varied, as desired, in order to obtain a desired rigidity and/or other mechanical characteristics of frame 110.

In various exemplary embodiments, frame 110 is configured with one or more curved portions 110A. In this manner, frame 110 may be configured to at least partially "flex" or bend in a suitable direction (e.g., in a vertical direction), responsive to an applied force. By varying the bend radius of curved portions 110A, the dimensions of frame 110 (e.g., the outer diameter, the inner diameter, the wall thickness, etc.), placement of various coupling brackets, and the like, frame 110 may be configured to flex in a desired manner. For example, frame 110 is configured to flex in a manner such that riding lawn mower 100 responds to an applied force as if riding lawn mower 100 were configured with a conventional shock absorber system (e.g., springs, struts, linkages, and/or the like). In this exemplary embodiment, frame 110 is configured to provide the equivalent of about 0.2 centimeters (0.2 cm) of suspension travel. In other exemplary embodiments, frame 110 is configured to provide the equivalent of between about 0.1 cm and about 5 cm of suspension travel. Moreover, flexion of frame 110 may also be viewed as spring-like. In various exemplary embodiments, frame 110 is configured with a frame K value of between about 3600 pounds per inch and about 4000 pounds per inch when considered in Hooke's law spring equation F=KX. In an exemplary embodiment, frame 110 is configured with a frame K value of about 3846 pounds per inch. By providing suspension-like and/or spring-like behavior, riding lawn mower 100 may be configured with an improved level of comfort for an operator, for example by reducing shock transferred to the rider. Moreover, by providing a suspension-like and/or spring-like function, frame 110 may reduce wear on and/or damage to other components of riding lawn mower 100.

Frame 110 may be monolithic. Alternatively, frame 110 may comprise multiple components coupled together. Moreover, frame 110 may be cast, pressed, sintered, die-cut, machined, stamped, bonded, laminated, polished, smoothed, bent, rolled, molded, plated, coated, and/or otherwise shaped and/or formed via any suitable method and/or apparatus.

In various exemplary embodiments, with reference now to FIGS. 1C, 2, 4, and 6, an engine, for example engine 130, is mounted to frame 110. Engine 130 is coupled to friction wheel 140 via a flywheel 134 configured with a friction plate 135. Disposed between flywheel 134 and engine 130 is a torque sensor 136.

In an exemplary embodiment, flywheel 134 comprises plastic or other suitably strong and/or lightweight material. Moreover, by utilizing a flywheel 134 comprising a first, lighter material, and friction plate 135 comprising a second, heavier and more durable material, the rotating mass is reduced while maintaining a suitable level of frictional force transfer capability between engine 130 and friction wheel 140. Flywheel 134 may also be coupled to other components of riding lawn mower 100, for example to a cutting blade via a belt and pulley system.

In an exemplary embodiment, friction plate 135 comprises steel. Friction plate 135 may comprise one or more of steel, aluminum, titanium, iron, and/or other suitable metals and/or alloys thereof. Friction plate 135 may comprise a material having a hardness exceeding that of aluminum, for example hardness in excess of 60 HRb on the Rockwell B scale. In an exemplary embodiment, friction plate 135 comprises a material having a hardness of about 75 on the Rockwell B scale. Moreover, friction plate 135 may comprise any suitable material configured to frictionally engage with friction wheel 140 in order to transfer force to other components of riding lawn mower 100. Friction plate 135 may be configured to be suitable for use over a variety of operating RPM ranges of engine 130, for example from about 0 RPM up to about 4000 RPM.

Friction plate 135 may be coupled to flywheel 134 via any suitable method and/or components, for example via mechanical fasteners disposed generally about the edges of friction plate 135. In this manner, friction plate 135 may be configured with an unbroken surface extending out from the center of friction plate 135 over which friction wheel 140 may traverse.

In certain prior art power transmission systems (e.g., certain prior art friction drives comprising a flywheel and a friction wheel), frictional components are pressed together with a generally constant normal force in order to achieve a desired level of power transmission without slipping. In these systems, radial movement of the friction wheel with respect to the flywheel often requires a significant radial force due to the high normal force pressing the flywheel and the friction wheel together. Application of a sufficient radial force to move the friction wheel with respect to the flywheel often results in radial "stepping" of the friction wheel across the flywheel, rather than a continuous spectrum of radial positions. Additionally, the radial force required to move the friction wheel can be large enough to be undesirable to a user tasked with manually providing the needed radial force.

In contrast, in accordance with the principles of the present disclosure and in various exemplary embodiments, friction plate 135 and friction wheel 140 are configured to be coupled with a varying normal force. Stated generally, friction wheel 140 and friction plate 135 may be engaged via a normal force sufficient to transfer an amount of torque required by riding lawn mower 100 at a particular operational point. As the torque required by riding lawn mower 100 increases, friction wheel 140 and friction plate 135 may be engaged via an increased normal force; similarly, as the torque required by riding lawn mower 100 decreases, friction wheel 140 and friction plate 135 may be engaged via a decreased normal force. In an exemplary embodiment, a torque sensing assembly linking friction plate 135 and engine 130 is configured with certain components having a generally helical shape. The geometry and material properties of the helical components are specified such that extension and retraction of the torque sensing assembly provides a desired normal force. In this manner, unnecessary wear on friction wheel 140 due to excessive and/or unnecessary normal force may be reduced, improving the operating lifetime of these components of riding lawn mower 100. Moreover, friction wheel 140 may thus be configured with a softer material as opposed to a friction wheel required to maintain a high, fixed normal force. Additionally, because riding lawn mower 100 is configured with a varying normal force, radial movement of friction wheel 140 on friction plate 135 requires a lower radial force when compared to systems applying a constant (usually excessive) normal force.

In various exemplary embodiments, the coefficient of friction between friction wheel 140 and friction plate 135 is between about 0.35 and about 1.75. In certain exemplary embodiments, the coefficient of friction between friction wheel 140 and friction plate 135 is between about 0.65 and about 0.85. In an exemplary embodiment, the coefficient of friction between friction wheel 140 and friction plate 135 is about 0.75. Moreover, friction wheel 140 and friction plate 135 may be configured with any suitable coefficient of friction therebetween in order to transfer torque.

Figure 4:
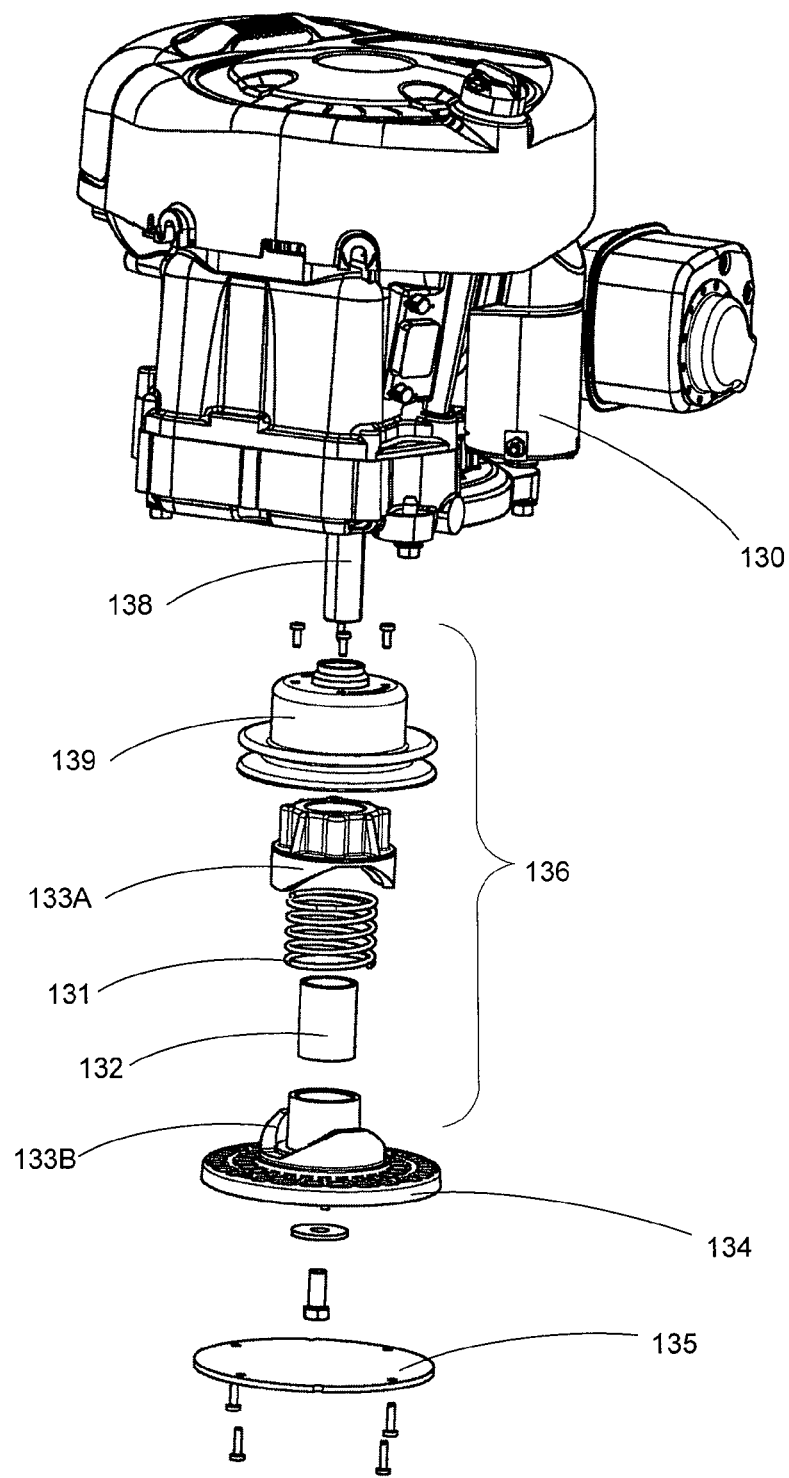
FIG. 4 illustrates components of a friction drive including torque sensing in accordance with an exemplary embodiment.

With reference now to FIG. 4, in an exemplary embodiment, flywheel 134 is coupled to engine 130 via an apparatus configured to sense and/or respond to torque, for example torque sensor 136.

In an exemplary embodiment, engine 130 comprises a crankshaft 138. Crankshaft 138 is coupled to engine pulley 139, for example by being keyed to a bearing tube disposed inside engine pulley 139. Moreover, crankshaft 138 may be coupled to engine pulley 139 in any suitable manner. When rotated, engine pulley 139 transfers force to deck drive 170, for example via a belt.

In an exemplary embodiment, torque sensor 136 comprises upper helix 133A. Upper helix 133A is at least partially disposed within and/or coupled to engine pulley 139. Upper helix 133A may be coupled to engine pulley 139 via fasteners and/or any other suitable method or mechanism. Torque sensor 136 may further comprise lower helix 133B having bushing 132 coupled thereto, for example via a press fit. Compression spring 131 is disposed between upper helix 133A and lower helix 133B to facilitate movement of lower helix 133B with respect to upper helix 133A. In an exemplary embodiment, lower helix 133B is slidably movable with respect to upper helix 133A via the interaction of bushing 132 and the bearing tube disposed within engine pulley 139.

Upper helix 133A and lower helix 133B may be formed via any suitable process, for example via die casting. Moreover, upper helix 133A and lower helix 133B may be cast, pressed, sintered, die-cut, machined, stamped, bonded, polished, smoothed, bent, molded, plated, coated, extruded, tempered, and/or otherwise shaped and/or formed via any suitable method and/or apparatus. In various exemplary embodiments, upper helix 133A and lower helix 133B comprise one or more of plastic, composite, metal (e.g., iron, steel, titanium, aluminum, and/or the like) or other suitable structural material. In an exemplary embodiment, upper helix 133A and lower helix 133B are formed of aluminum. In another exemplary embodiment, upper helix 133A and lower helix 133B are formed of a composite material.

In an exemplary embodiment, flywheel 134 and lower helix 133B are monolithic. In other exemplary embodiments, flywheel 134 and lower helix 133B comprise separate components coupled together.

Moreover, flywheel 134 and engine 130 may be coupled via components configured to facilitate movement of flywheel 134 away from and/or toward engine 130 along the axis of rotation of flywheel 134, in order to vary the normal force between friction plate 135 and friction wheel 140. In an exemplary embodiment, responsive to rotation of crankshaft 138, angled surfaces on upper helix 133A engage corresponding angled surfaces on lower helix 133B, imparting rotational force to flywheel 134 and extending flywheel 134 away from engine 130.

In various exemplary embodiments, engine 130 operates at a fixed RPM, for example an RPM of between about 2500 RPM to about 3900 RPM. In an exemplary embodiment, engine 130 operates at about 3200 RPM. In other exemplary embodiments, engine 130 operates at a variable RPM, for example under the control of a throttle operated by a user.

Responsive to rotation of crankshaft 138 of engine 130 at a particular RPM, flywheel 134 is forced a selected distance away from engine 130 due to the interaction of corresponding angled surfaces on upper helix 133A and lower helix 133B. This results in a selected normal force between friction plate 135 and friction wheel 140. As the torque transferred between friction plate 135 and friction wheel 140 increases, lower helix 133B partially rotates in a first direction with respect to upper helix 133A, forcing flywheel 134 further away from engine 130 and thus increasing the normal force between friction plate 135 and friction wheel 140. Similarly, as the torque transferred between friction plate 135 and friction wheel 140 decreases, lower helix 133B partially rotates in a second, opposite direction with respect to upper helix 133B, moving flywheel 134 closer to engine 130 and thus decreasing the normal force between friction plate 135 and friction wheel 140.

The normal force between friction plate 135 and friction wheel 140 resulting from operation of torque sensor 136 may be selected and/or configured based on any suitable variables, for example the helix angles of upper helix 133A and lower helix 133B, the coefficient of friction between upper helix 133A and lower helix 133B, the surface finish of upper helix 133A and/or lower helix 133B, the material comprising upper helix 133A and/or lower helix 133B, the coefficient of friction between friction plate 135 and friction wheel 140, and/or the like. In this manner, friction plate 135 coupled to flywheel 134 can engage friction wheel 140 with a varying normal force. In various exemplary embodiments, friction plate 135 and friction wheel 140 are engaged with a normal force of between about 0 pounds and about 100 pounds.

In various exemplary embodiments, the helix angles of upper helix 133A and lower helix 133B are between about 25 degrees and about 75 degrees. In an exemplary embodiment, the helix angles of upper helix 133A and lower helix 133B are about 30 degrees.

In various exemplary embodiments, the coefficient of friction between upper helix 133A and lower helix 133B is between about 0.1 and about 0.4. In an exemplary embodiment, the coefficient of friction between upper helix 133A and lower helix 133B is about 0.22.

Stated generally, as the coefficient of friction between friction wheel 140 and friction plate 135 is increased, a suitable helix angle of upper helix 133A and lower helix 133B also increases for a particular desired normal force. Moreover, as the coefficient of friction between friction wheel 140 and friction plate 135 is decreased, a suitable helix angle of upper helix 133A and lower helix 133B also decreases for a particular desired normal force.

In various exemplary embodiments, riding lawn mower 100 may be configured to transfer at least 150 foot-pounds of torque at the rear wheels while requiring no more than between about 2 pounds of normal force and about 45 pounds of normal force between friction plate 135 and friction wheel 140. Moreover, riding lawn mower 100 may be configured to transfer at least 70 foot-pounds of continuous operating torque at the rear wheels while requiring no more than between about 2 pounds of normal force and about 45 pounds of normal force between friction plate 135 and friction wheel 140.

In various exemplary embodiments, riding lawn mower 100 is configured to transfer at least 150 foot-pounds of torque between friction plate 135 and differential 150 via friction wheel 140. In an exemplary embodiment, riding lawn mower 100 is configured to transfer about 150 foot-pounds of torque between friction plate 135 and differential 150 via friction wheel 140 while requiring no more than between about 2 pounds of normal force and about 45 pounds of normal force between friction plate 135 and friction wheel 140.

In various exemplary embodiments, radial movement of friction wheel 140 on friction plate 135 may be accomplished via a radial force of less than 45 pounds while at least 150 foot-pounds of torque are transferred between friction wheel 140 and friction plate 135. In an exemplary embodiment, radial movement of friction wheel 140 on friction plate 135 is accomplished via a radial force of about 38 foot-pounds while at least 125 foot-pounds of torque are transferred between friction wheel 140 and friction plate 135. In another exemplary embodiment, radial movement of friction wheel 140 on friction plate 135 is accomplished via a radial force of about 29 foot-pounds while at least 100 foot-pounds of torque are transferred between friction wheel 140 and friction plate 135. In another exemplary embodiment, radial movement of friction wheel 140 on friction plate 135 is accomplished via a radial force of about 21 foot-pounds while at least 75 foot-pounds of torque are transferred between friction wheel 140 and friction plate 135. In yet another exemplary embodiment, radial movement of friction wheel 140 on friction plate 135 is accomplished via a radial force of about 13 foot-pounds while at least 50 foot-pounds of torque are transferred between friction wheel 140 and friction plate 135. In yet another exemplary embodiment, radial movement of friction wheel 140 on friction plate 135 is accomplished via a radial force of about 4 foot-pounds while at least 25 foot-pounds of torque are transferred between friction wheel 140 and friction plate 135. Moreover, radial movement of friction wheel 140 on friction plate 135 may be accomplished via any suitable radial force, and the examples provided above are by way of illustration and not of limitation.

With reference now to FIGS. 5A-5F, friction wheel 140 may be configured to frictionally engage with friction plate 135. Friction wheel 140 comprises friction ring 141 coupled to wheel body 142. Wheel body 142 may be configured to provide structural support to friction wheel 140. Moreover, wheel body 142 may be configured to couple to and/or form a part of other power transfer components (e.g., a clutch, for example clutch 190), in order to transfer force received via friction ring 141.

Friction ring 141 may comprise any suitable material configured to frictionally engage friction plate 135. Friction ring 141 may comprise rubber, a composite, or any other suitable material. Friction ring 141 may be removed from wheel body 142 and replaced with a new ring 141, as suitable, for example responsive to wear.

In an exemplary embodiment, when friction wheel 140 is displaced across friction plate 135 in a first direction out from the center of friction plate 135, riding lawn mower 100 is operative in a "forward" direction. Conversely, when friction wheel 140 is displaced across friction plate 135 in a second direction (opposite the first direction) out from the center of friction plate 135, riding lawn mower 100 is operative in a "reverse" direction. In various exemplary embodiments, the mechanical components configured to displace friction wheel 140 in the reverse direction simultaneously operate a "reverse" direction indicator, for example via a lever arm closing an electrical contact. In this manner, an operator may be notified of "reverse" operation each time riding lawn mower 100 enters operation in the reverse direction.

With continued reference to FIGS. 5A-5F, a clutch 190 may be configured to transfer force between friction wheel 140 and differential 150. Clutch 190 may comprise various clutch plates, clutch housings, pressure plates, throwout bearings, and/or the like, as suitable, in order to transfer power in an interruptible manner between friction wheel 140 and differential 150. Portions of clutch 190 (e.g., outer portions of the clutch case) may be formed of aluminum or other suitable material to facilitate structural rigidity and/or heat dissipation.

Clutch 190 may be configured to slip in order to reduce and/or prevent damage to other components of riding lawn mower 100. In an exemplary embodiment, clutch 190 is configured to slip at between about 60 inch-pounds of torque and about 80 inch-pounds of torque. In certain exemplary embodiments, clutch 190 is configured to slip at about 150 foot-pounds of torque at the rear wheel of riding lawn mower 100. Moreover, clutch 190 may be configured to slip at any suitable torque level, as desired.

Figure 5C:
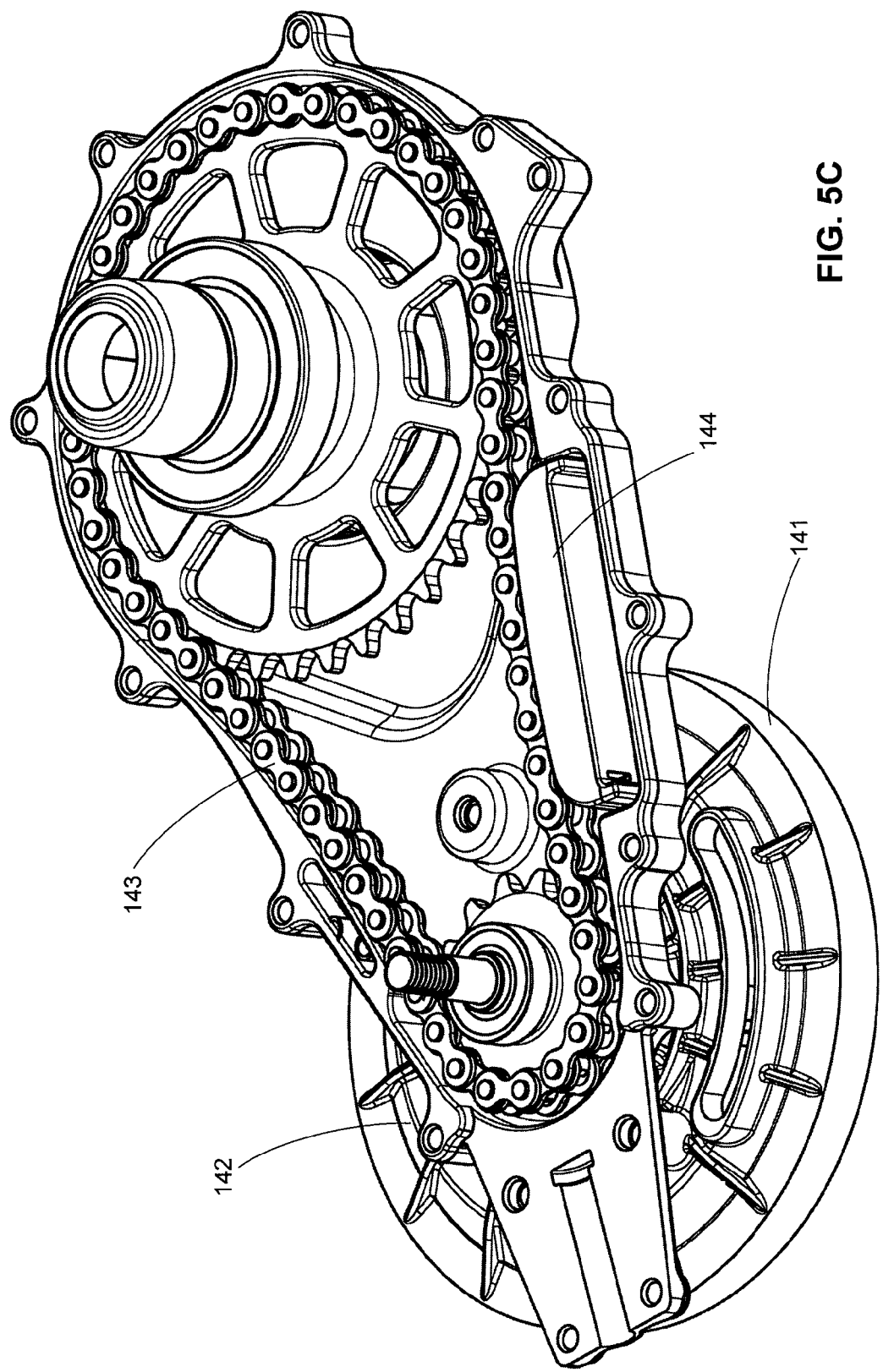
Figure 5D:
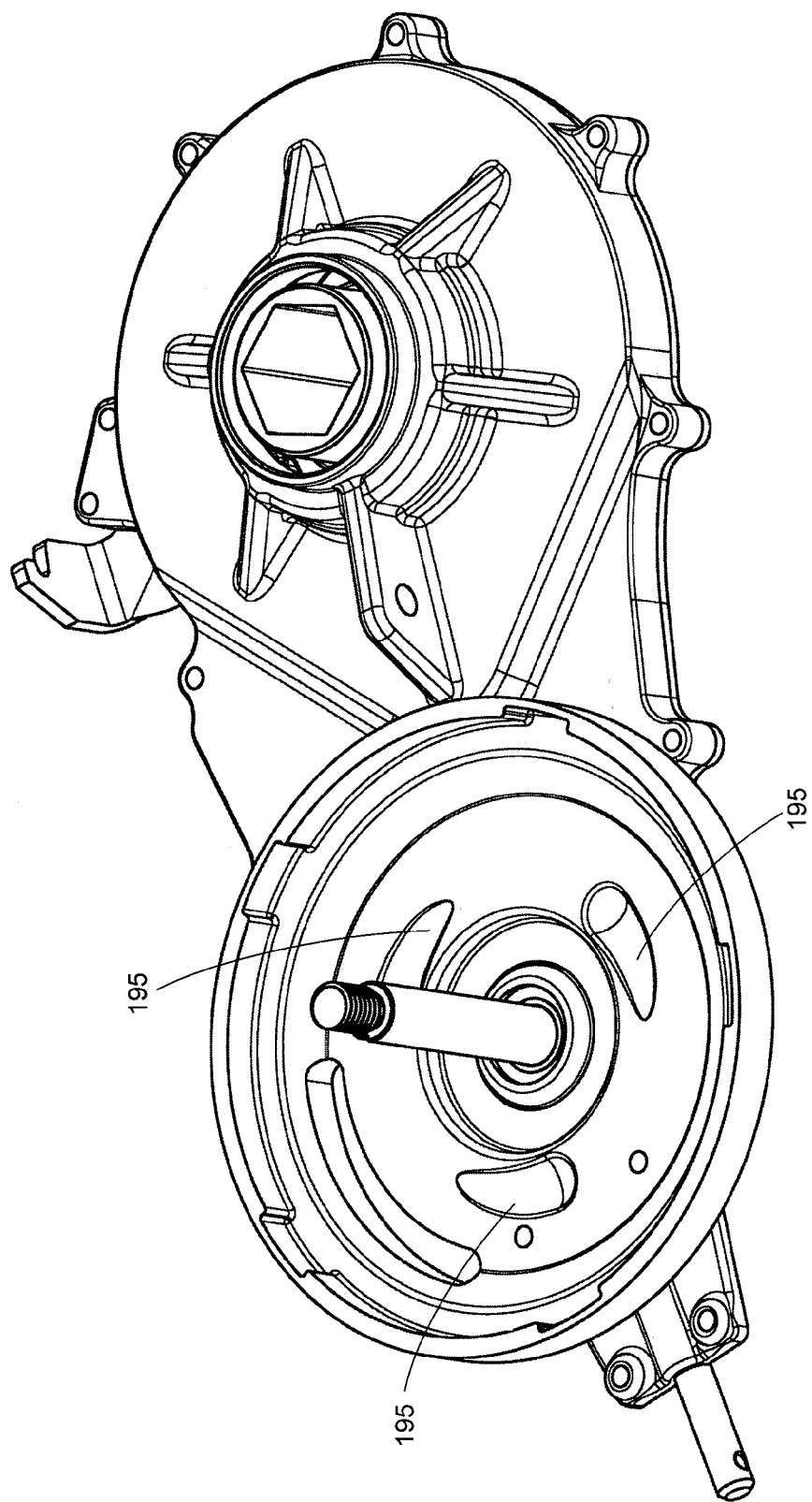
Figure 6:
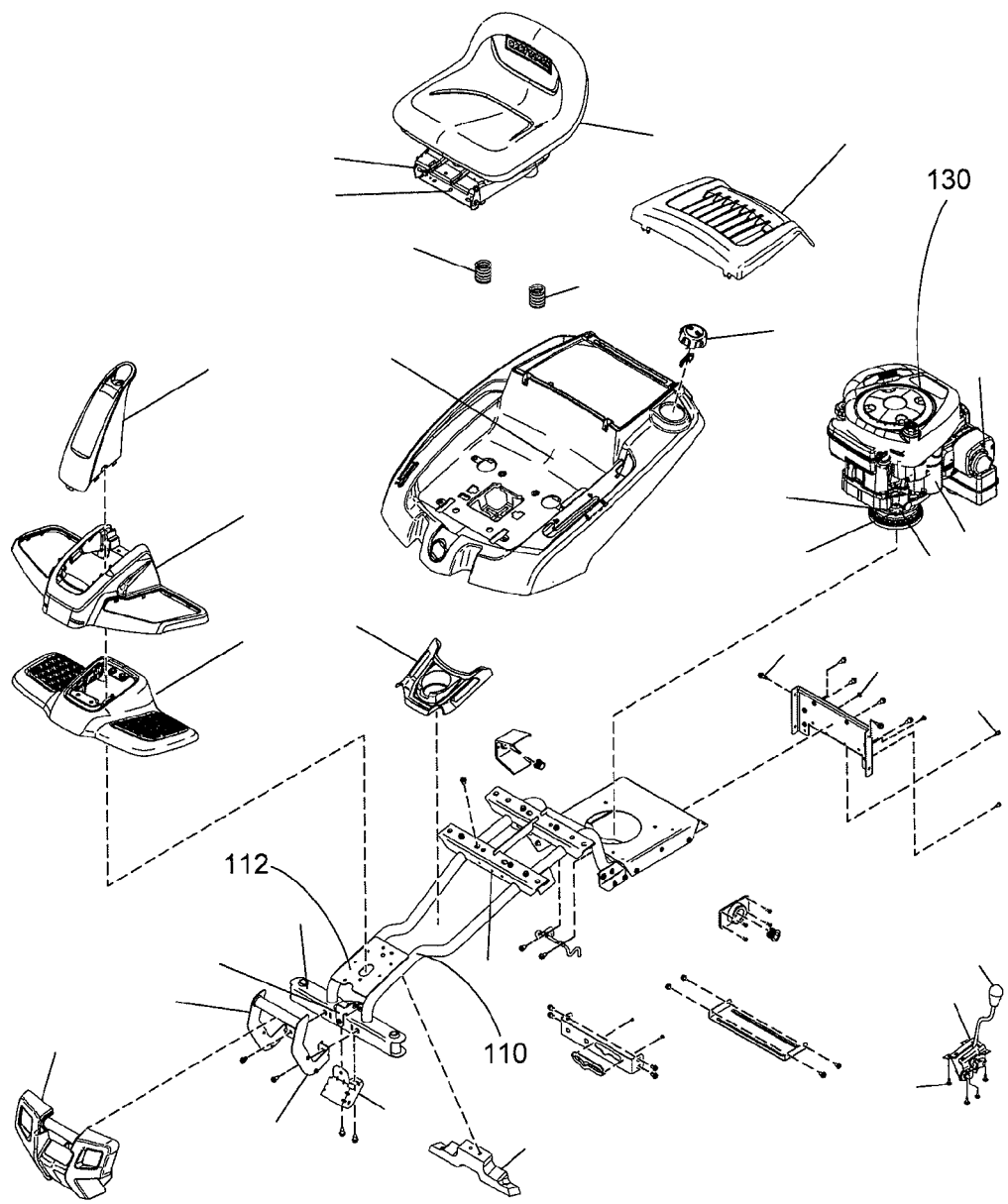
FIG. 6 illustrates an exploded view of components of a riding lawn mower in accordance with an exemplary embodiment.

With momentary reference to FIG. 5C, in various exemplary embodiments power may be transferred from clutch 190 (for example, to differential 150) via chain 143. A desirable level of tension on chain 143 may be facilitated via use of tensioning block 144, for example in order to improve component lifetime and/or reduce noise.

Figure 3A:
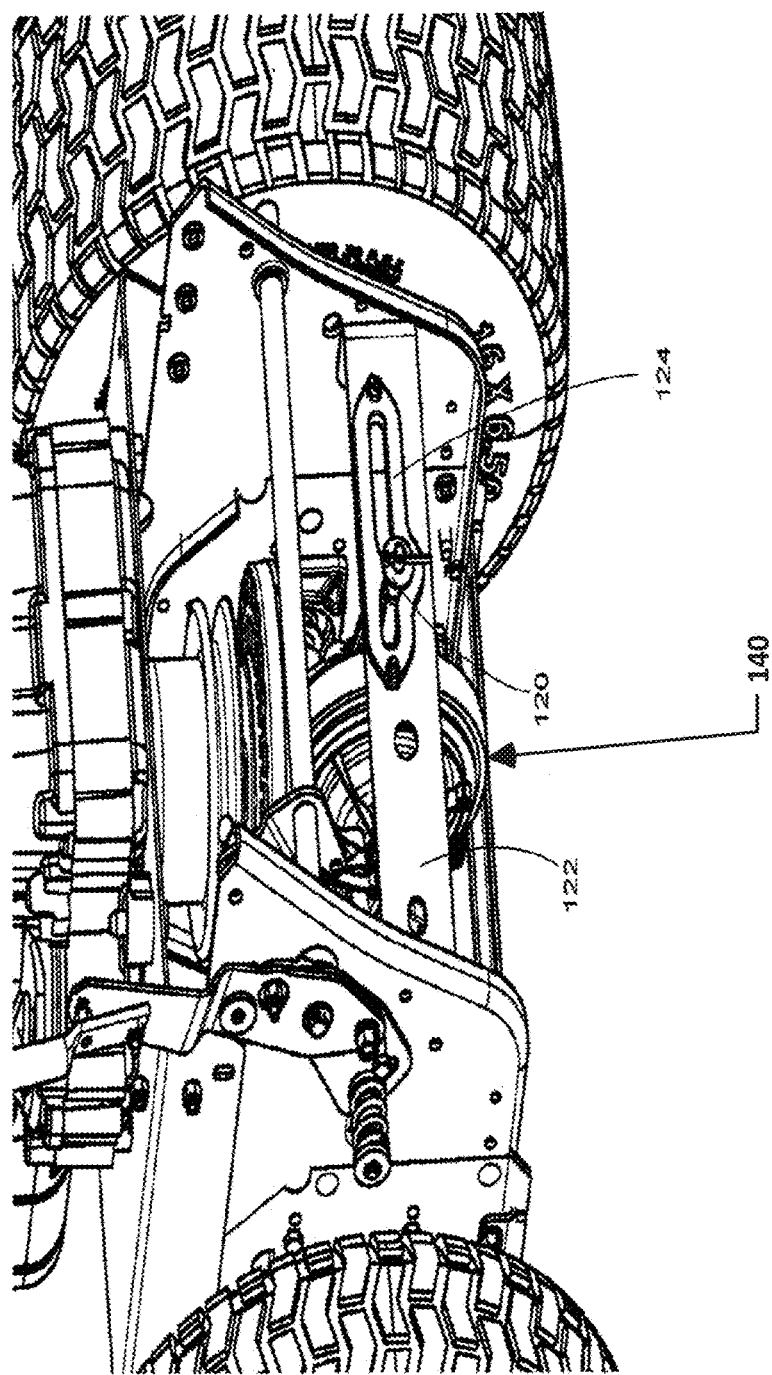

Returning now to FIGS. 3A and 3B, friction wheel 140 and clutch 190 may be configured to move (for example, pivoting generally about the rear axle of riding lawn mower 100; radially moving with respect to friction plate 135; and/or the like) responsive to movement of lever arm 120. Lever arm 120 is configured to move within a range defined by clutch track 124 coupled to clutch bracket 122.

Clutch track 124 comprises a material configured to reduce the shift friction when moving friction wheel 140 with respect to friction plate 135. In an exemplary embodiment, clutch track 124 may comprise nylon and/or high density polyethelyne. Clutch track 124 may be configured with a notch 325 generally aligned with the center of flywheel 134 (i.e., the neutral position). In this manner, friction wheel 140 may be disengaged from friction plate 135 when at the generally neutral position, reducing flat spotting of friction wheel 140. Moreover, clutch track 124 may be configured with any suitable materials, notches, curves, and/or the like in order to facilitate a desired engagement profile of friction wheel 140 with friction plate 135.

Figure 3C:
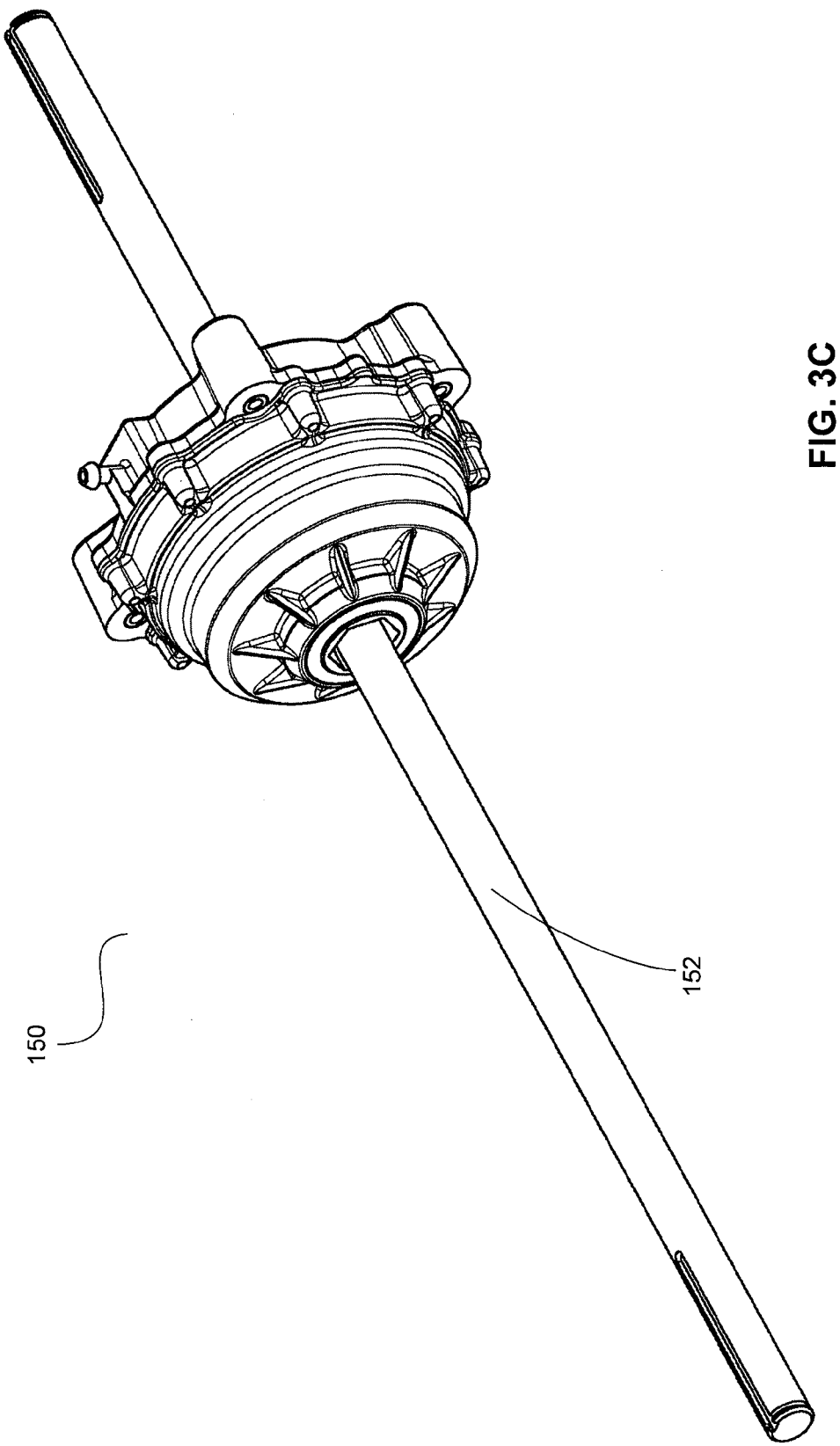
FIGS. 3C and 3D illustrate a differential for a riding lawn mower in accordance with an exemplary embodiment.
Figure 3D:
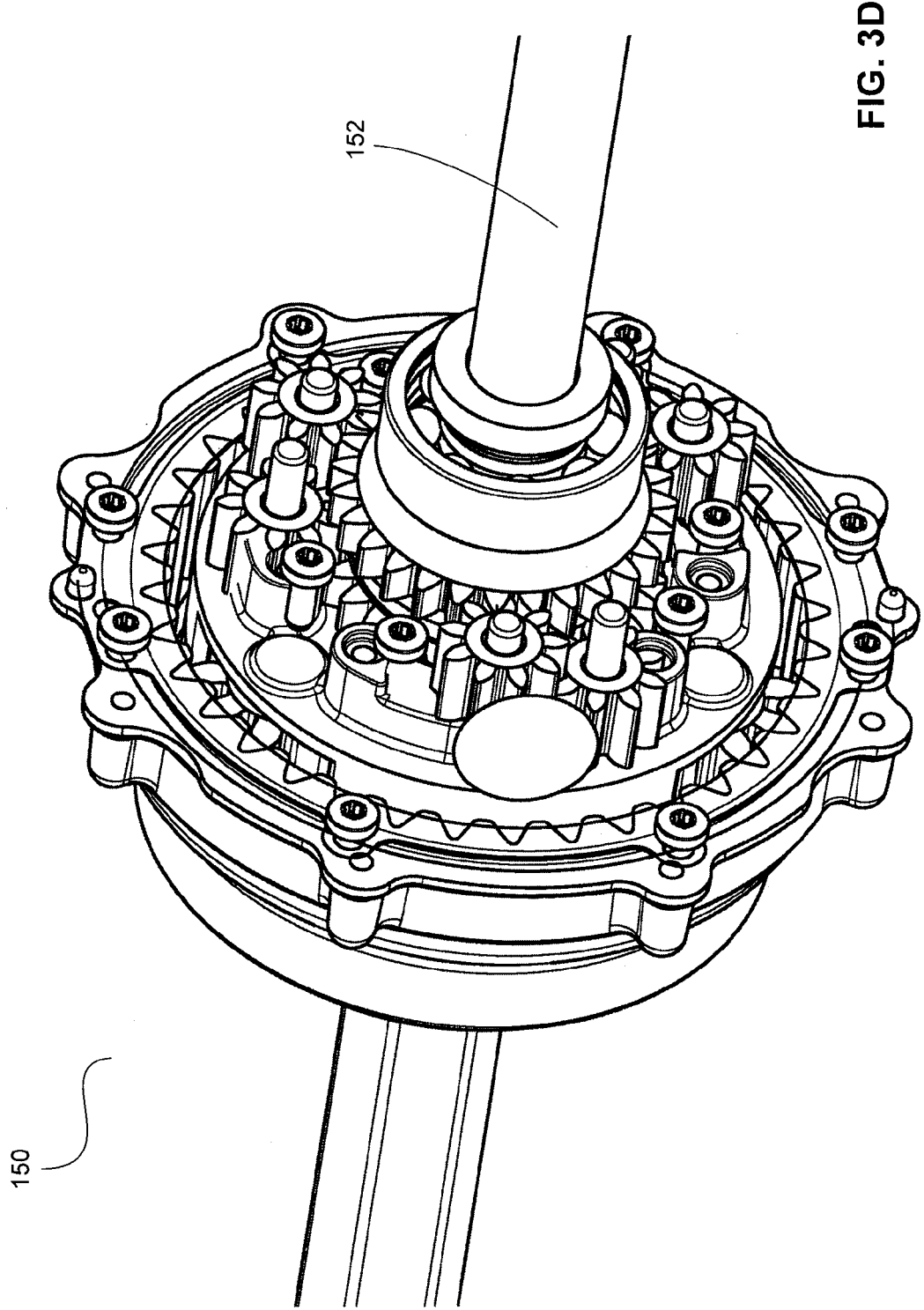
Figure 3E:
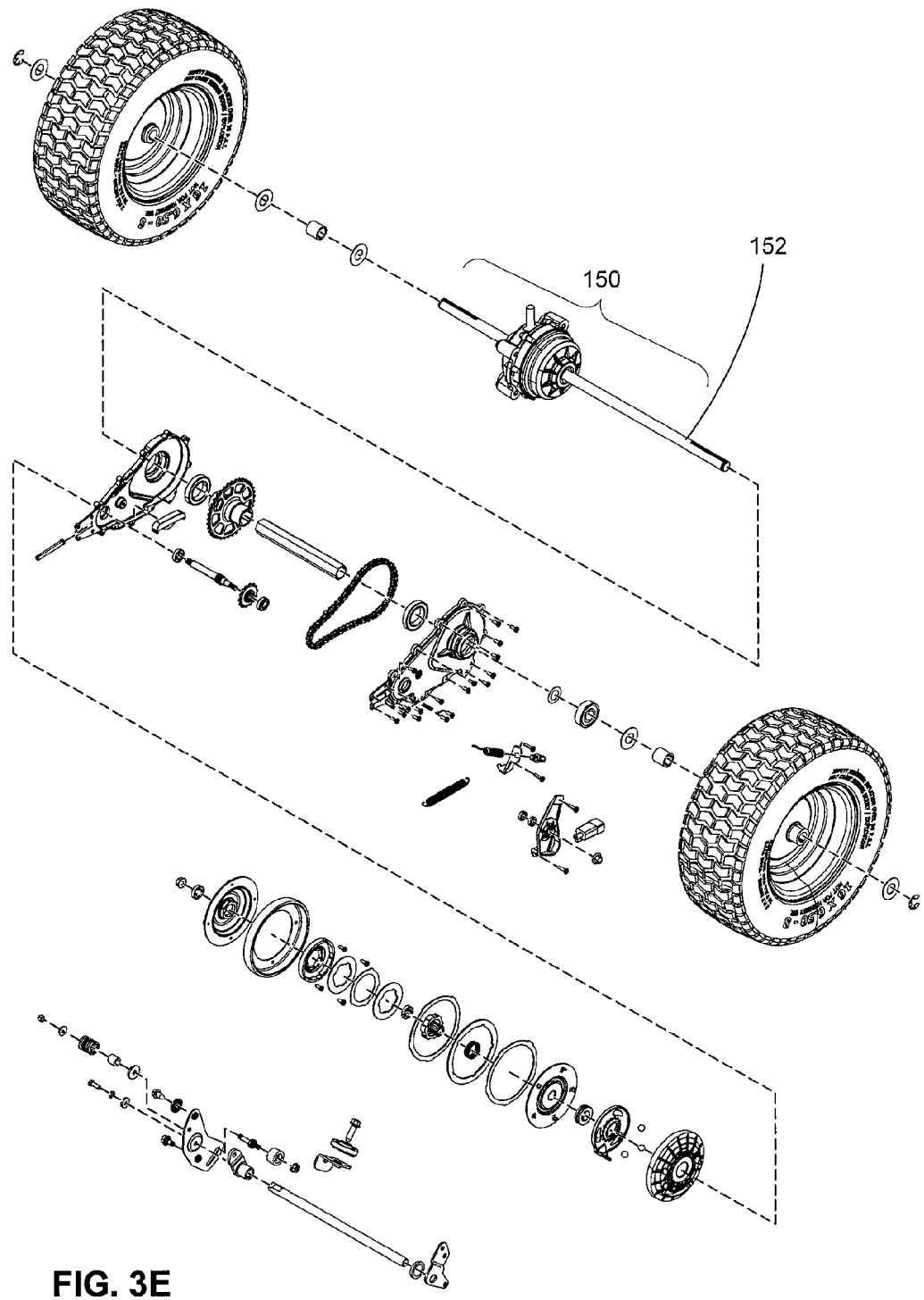
FIG. 3E illustrates an exploded view of components of a drivetrain for a riding lawn mower in accordance with an exemplary embodiment.

Once power is transferred from engine 130 to friction wheel 140, it may then be delivered to other components of riding lawn mower 100, for example to a differential 150. With reference now to FIGS. 3C and 3D, a differential 150 may comprise a plurality of gears (e.g., one or more of ring gears, planet gears, side gears, and/or the like). One or more gears comprising differential 150 may comprise plastic or other suitable structural material, for example in order to reduce one or more of noise, weight, cost, and/or the like. Differential 150 may be comprised entirely of plastic gears, reducing weight and expense.

In an exemplary embodiment, differential 150 comprises at least one differential shaft 152. Differential shaft 152 may comprise any suitable structural material configured to transfer torque, for example, steel, aluminum, titanium, iron, and/or the like. Differential shaft 152 may be monolithic. Differential shaft 152 may also comprise multiple portions. Moreover, portions of differential shaft 152 may be coupled to one another in any suitable manner.

Figure 7:
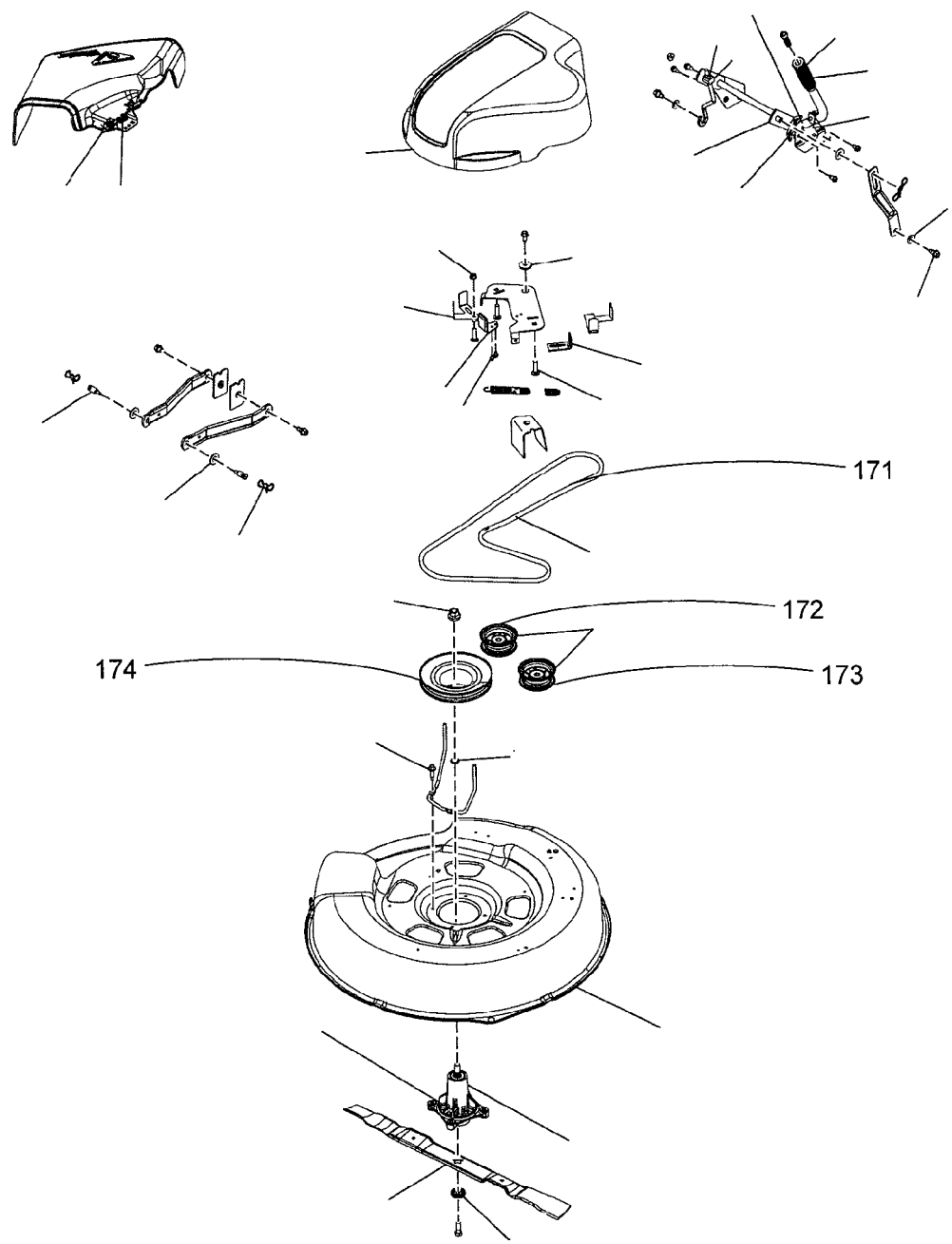
FIG. 7 illustrates an exploded view of components of a cutting deck and deck drive for a riding lawn mower in accordance with an exemplary embodiment.

Turning now to FIG. 7, in various exemplary embodiments, riding lawn mower 100 is configured as a "single belt" system. Stated another way, riding lawn mower 100 is configured with one belt coupling engine 130 to deck drive 170, but no other belts. In various prior riding lawn mowers and/or lawn tractors, a "dual belt" system is utilized, where one belt couples the engine and the deck drive, and another belt couples the engine and the ground drive. In contrast, a single-belt system in accordance with principles of the present disclosure allows for reduced complexity and reduced manufacturing expense.

In various exemplary embodiments, riding lawn mower 100 is configured as a "dual pulley" system. Stated another way, riding lawn mower 100 is configured with two pulleys for adjusting tension on a belt coupling engine 130 and deck drive 170. In various prior riding lawn mowers and/or lawn tractors, a "single pulley" system is utilized. In contrast, a dual-pulley system in accordance with principles of the present disclosure allows for greater geometric advantage when varying the tension on an associated belt.

Deck drive 170 may comprise a belt 171 routed about pulleys 172 and 173. Pulleys 172 and/or 173 may be spring-loaded or otherwise configured to impart a desired tension to belt 171, for example responsive to operation of a clutch. Belt 171 transfers force to deck pulley 174 which is coupled to a cutting blade configured to cut grass. As the clutch is engaged, pulleys 172 and 173 move, taking up slack in belt 171 and thus gradually engaging belt 171 against pulleys 172, 173, and 174 in order to turn a cutting blade coupled to pulley 174. As the clutch is released, pulleys 172 and 173 move in an opposite direction, reducing tension in belt 171 and thus at least partially disengaging belt 171 from pulleys 172, 173, and 174. Thus, force is no longer delivered to the cutting blade, and the cutting blade eventually ceases rotation.

Pulleys 172 and 173 may be configured with an extended height in order to allow for greater vertical displacement of pulley 174 and/or other components of deck drive 170. Pulleys 172 and 173 may be configured with a height at least twice the height of belt 171, providing additional room for belt 171 to move with respect to pulleys 172 and 173. In this manner, deck drive 170 can accommodate increased vertical displacement as compared to deck drives lacking pulleys with extended heights.

Figure 8:
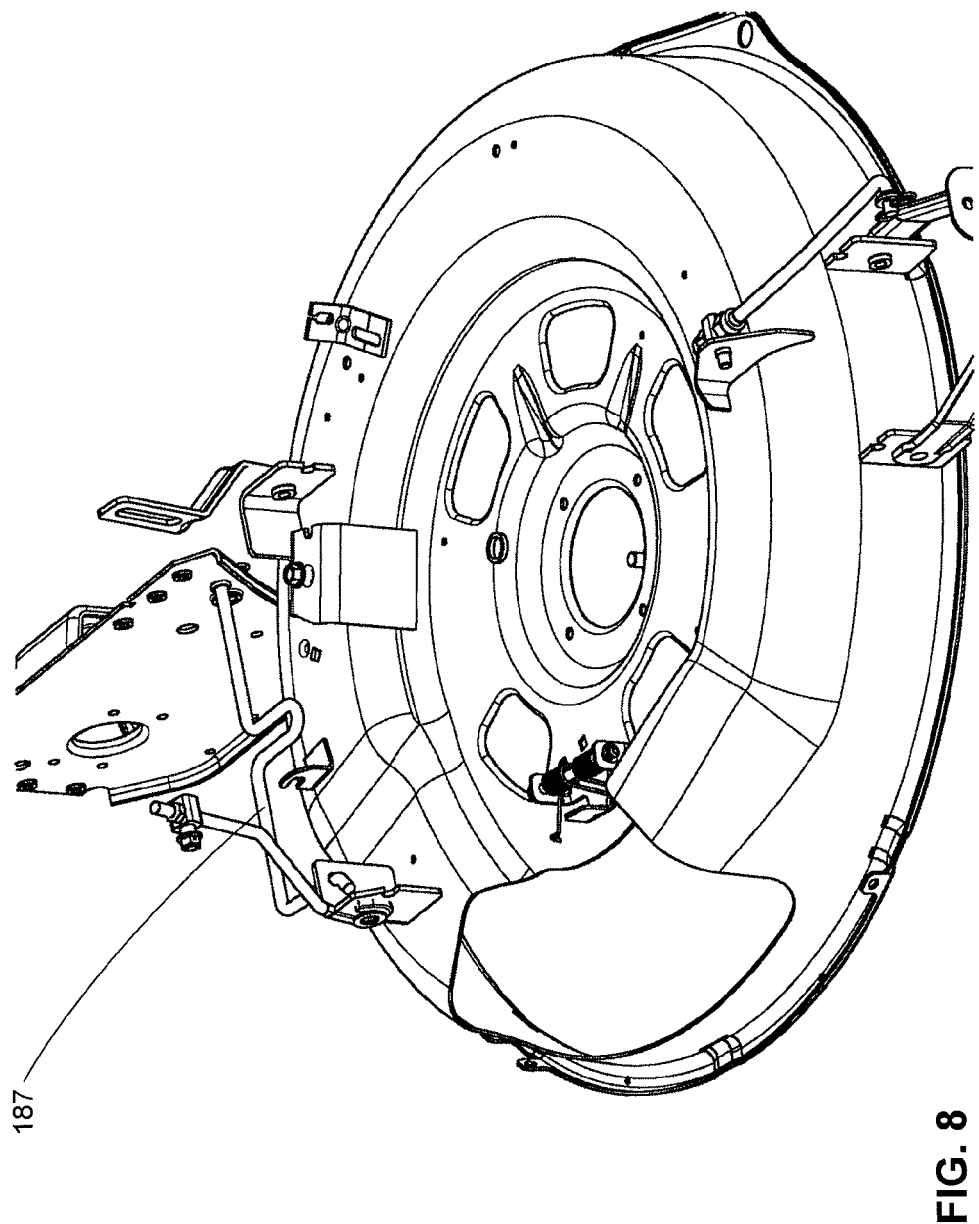
FIG. 8 illustrates a sway bar for a riding lawn mower in accordance with an exemplary embodiment.

With reference now to FIG. 8, in various exemplary embodiments, riding lawn mower 100 is configured with a sway bar 187 associated with the cutting deck. Sway bar 187 is configured to act as a spring at a certain load responsive to displacement of the cutting deck in order to prevent damage to the friction drive or other components of riding lawn mower 100. In an exemplary embodiment, sway bar 187 is configured to act as a spring responsive to an applied force of about 400 pounds or more. In another exemplary embodiment, sway bar 187 is configured to act as a spring responsive to an applied force of about 500 pounds or more. Moreover, sway bar 187 may be configured to act as a spring responsive to any suitable level of applied force, as desired.

In order to reduce the likelihood of injury, a cutting blade of a riding lawn mower and/or a ground drive of a riding lawn mower may rapidly come to a stop in connection with a clutch being disengaged. Thus, in various exemplary embodiments, riding lawn mower 100 is configured with one or more linked clutch and brake systems. For example, riding lawn mower 100 may be configured with a linked deck drive clutch and deck drive brake. Moreover, riding lawn mower 100 may be configured with a linked ground drive clutch and ground drive brake. The deck drive clutch and the ground drive clutch may operate independently from one another.

In an exemplary embodiment, a deck drive of riding lawn mower 100 may be engaged and/or disengaged as desired, for example via a hand lever. Responsive to declutching of the hand lever to disengage the deck drive, a deck drive brake may simultaneously be activated in order to more quickly bring an associated cutting blade to a stop. Stated another way, declutching the deck drive automatically activates a deck drive brake.

Similarly, in an exemplary embodiment a ground drive of riding lawn mower 100 may be engaged and/or disengaged as desired, for example via a foot pedal. Responsive to movement of a ground drive brake pedal, the ground drive of riding lawn mower 100 may be declutched and a ground drive brake applied. In this manner, riding lawn mower 100 may be quickly brought to a stop. Stated another way, applying the ground drive brake automatically declutches the ground drive.

Returning again to FIGS. 5B-5F, in various exemplary embodiments a brake arm 182 is coupled to clutch 190. Brake arm 182 is spring loaded via spring 184. In these exemplary embodiments, clutch 190 is configured to permit a braking force to be transferred via brake arm 182 when clutch 190 is disengaged.

In an exemplary embodiment, within clutch 190, various clutch discs 192 are located on a first side of a pressure plate 194, and a brake disc is located on a second side of pressure plate 194. Throwout bearings disposed in sloped bearing trenches 195 cause pressure plate 194 to move in an axial direction. In this manner, clutch 190 is configured to clutch when in a first configuration (when pressure plate 194 is urged in a first axial direction) and to brake when in a second configuration (when pressure plate 194 is urged in a second axial direction opposite the first direction). Stated another way, in these exemplary embodiments, clutch 190 which activates power delivery from friction wheel 140 to differential 150 also functions as a brake to bring riding lawn mower 100 to a stop, when desired.

With momentary reference to FIGS. 1A and 7, riding lawn mower 100 may be configured with a self-centering cutting deck 184. As used herein, "self-centering" generally refers to a cutting deck configured to return to a centered position with respect to the sides of lawn mower 100 after being displaced. For example, when an operator steps on cutting deck 184, cutting deck 184 and/or components coupling cutting deck 184 to frame 110 are configured to flex, bend, slide, and/or otherwise move responsive to the applied force. Thus, cutting deck 184 may move sideways a certain distance. Once the applied force is removed, for example when an operator removes a foot, cutting deck 184 returns to a centered position. Self-centering may be achieved, for example, via suspending cutting deck 184 from frame 110 in a suitable manner, for example by utilizing angled metal bars having similar dimensions. Responsive to displacement of cutting deck 184, the bars generate a force tending to move cutting deck 184 back to a centered position. Springs and other mechanical approaches may also be utilized, as suitable.

Cutting deck 184 may be configured with a default "mulch mode". In these embodiments, cutting deck 184 may be configured with a removable plug intended to block egress of cut grass or other waste material to a bagging system, deflector, or other processing apparatus. Default installation of a mulch plug rather than a deflector can enable riding lawn mower 100 to be narrower, facilitating packaging and/or shipping.

Figure 9:
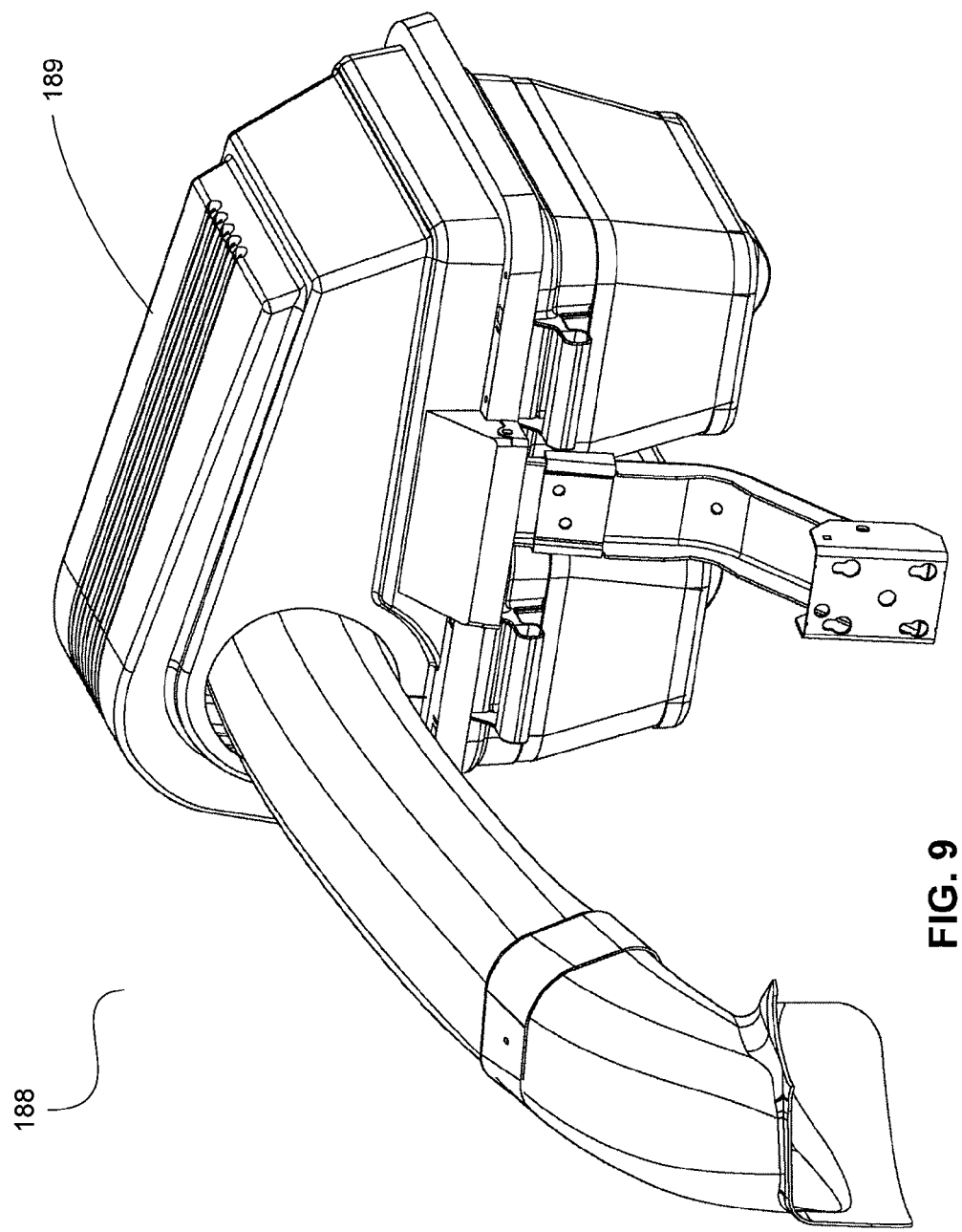
FIG. 9 illustrates a rear bagging system for the riding lawn mower of FIGS. 1A and 1B in accordance with an exemplary embodiment.

Riding lawn mower 100 may be configured with a rear bagging system. Turning now to FIG. 9, in an exemplary embodiment riding lawn mower 100 is configured with a rear bagging system 188. Rear bagging system 188 may be configured as a single-bag system; alternatively, rear bagging system 188 may be configured with two or more bags. In various exemplary embodiments, rear bagging system 188 is configured as a low-profile bagging system. Stated another way, rear bagging system 188 may be configured with a bagger top and/or lid that is at a reduced height compared to the ground. The resulting lower center of gravity is advantageous in improving stability and/or maneuverability of riding lawn mower 100.

In various exemplary embodiments, rear bagging system 188 may be configured with pivoting bagging lid 189. Pivoting bagging lid 189 allows the operator of riding lawn mower 100 to have easier and/or improved access to the grass bags. Pivoting bagging lid 189 may pivot toward the front of riding lawn mower 100; alternatively, pivoting bagging lid 189 may pivot toward either the left side of riding lawn mower 100 or the right side of riding lawn mower 100. Moreover, pivoting bagging lid 189 may comprise multiple pivoting bagging lids, each of which may be independently pivotable in similar and/or different directions.

In an exemplary embodiment, riding lawn mower 100 may be configured with a fuel tank located generally toward the front of riding lawn mower 100, for example generally adjacent to and/or integrated with the steering column. In this manner, fuel for riding lawn mower 100 may act as a counterweight. Moreover, the fuel level of riding lawn mower 100 may thus be more easily ascertainable to a user when seated on riding lawn mower 100, for example via a fuel gauge visible on the exterior of the fuel tank.

Riding lawn mower 100 may be configured with a battery located generally toward the front of riding lawn mower 100, for example near the steering column. In this manner, the battery may act as a counterweight, improving handling of riding lawn mower 100.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A riding lawn mower comprising an internal combustion engine and a differential coupled to the engine via a friction drive, wherein the friction drive comprises:
   a friction plate coupled to a flywheel, wherein the friction plate and flywheel are arranged in a first plane;
   a friction wheel arranged in a second plane and engageable to the friction plate, wherein the second plane is perpendicular to the first plane, and wherein the friction plate is arranged between the flywheel and the friction wheel, and wherein the friction wheel and friction plate are engaged via a variable normal force; and
   a torque sensor coupled between the engine and the flywheel, wherein the torque sensor, in response to rotation of a crankshaft, is configured to facilitate movement of the flywheel away from or toward the engine along an axis of rotation of the flywheel in order to vary the variable normal force between the friction plate and the friction wheel.

2. The riding lawn mower of claim 1, wherein the friction drive is configured to transmit at least 150 foot-pounds of torque to the differential while needing no more than 45pounds of radial force in order to translate the friction wheel in a radial direction with respect to the friction plate.

3. The riding lawn mower of claim 1, wherein the variable normal force is between about 0 pounds and about 100 pounds.

4. The riding lawn mower of claim 1, wherein the torque sensor comprises:
   an upper helix having angled surfaces and coupled to a pulley, wherein the pulley is configured to transfer force to a deck drive via a belt; and
   a lower helix having angled surfaces which correspond to the angled surface of the upper helix, wherein the angled surfaces of the lower helix are engageable to the angled surfaces of the upper helix to transfer rotational force to the flywheel to move the flywheel away from the engine.

5. The riding lawn mower of claim 4, wherein the torque sensor further comprises a compression spring disposed between the upper helix and the lower helix.

6. The riding lawn mower of claim 4, wherein the angled surfaces of the upper helix and the lower helix are between 25 degrees and 75 degrees.

7. The riding lawn mower of claim 4, wherein a coefficient of friction between the upper helix and the lower helix is between 0.1 and 0.4.

8. The riding lawn mower of claim 1, further comprising a dual-tubular frame coupled to a cutting deck and a housing of the engine.

9. The riding lawn mower of claim 8, wherein the dual-tubular frame is configured to bend responsive to an applied force, and wherein the dual-tubular frame has a spring coefficient (K) value of between about 3800 pounds per inch and about 3900 pounds per inch.

10. The riding lawn mower of claim 8, wherein the cutting deck is configured with a sway bar configured to act as a spring responsive to an applied force exceeding 400pounds.

11. The riding lawn mower of claim 1, wherein the friction drive further comprises a first clutch configured to transfer power to the differential.

12. The riding lawn mower of claim 1, wherein the flywheel is coupled to a deck drive, the deck drive having a belt routed about a first pulley and a second pulley, wherein the belt is configured to transfer force to a deck pulley which is coupled to a cutting blade of the riding lawn mower.

13. The riding lawn mower of claim 1, wherein power transferred via the friction wheel is coupled to at least one wheel of the riding lawn mower without the power being transferred by a belt or pulley.

14. The riding lawn mower of claim 1, wherein the riding lawn mower is configured as a single belt system.

15. The riding lawn mower of claim 4, wherein as the rotational force increases, the lower helix partially rotates in a first direction with respect to the upper helix to force the flywheel further away from the engine thereby increasing the variable normal force between the friction plate and the friction wheel.

16. The riding lawn mower of claim 15, wherein as the rotational force decreases, the lower helix partially rotates in a second direction with respect to the upper helix to move the flywheel closer to the engine thereby decreasing the variable normal force between the friction plate and the friction wheel.

17. A drivetrain for outdoor power equipment powered by an internal combustion engine, the drivetrain comprising:
   a friction plate coupled to a flywheel, wherein the friction plate and flywheel are arranged in a first plane;
   a friction wheel arranged in a second plane and frictionally engageable with the friction plate, wherein the second plane is perpendicular to the first plane, and wherein the friction plate is arranged between the flywheel and the friction wheel, and wherein the friction wheel and friction plate are engaged via a variable normal force;
   a differential coupled to the friction wheel in order to transfer power to at least one drive wheel of the outdoor power equipment; and
   a torque sensor coupled between the engine and the flywheel, wherein the torque sensor, in response to rotation of a crankshaft, is configured to facilitate movement of the flywheel away from or toward the engine along an axis of rotation of the flywheel in order to vary the variable normal force between the friction plate and the friction wheel.

18. The drivetrain of claim 17, wherein the friction wheel is translatable in a radial direction with respect to the friction plate via radial force of less than 45pounds while a torque in excess of 150 foot-pounds is transferred between the friction wheel and the friction plate.

19. The drivetrain of claim 17, wherein the drivetrain is configured with only a single belt, and wherein the belt couples the flywheel to a work assembly.

20. The drivetrain of claim 17, wherein the torque sensor comprises:
- an upper helix having angled surfaces and coupled to a pulley, wherein the pulley is configured to transfer force to a deck drive via a belt; and
- a lower helix having angled surfaces which correspond to the angled surface of the upper helix, wherein the angled surfaces of the lower helix are engageable to the angled surfaces of the upper helix to transfer rotational force to the flywheel to move the flywheel away from the engine.

* * * * *